United States Patent
Swart et al.

(10) Patent No.: US 6,964,787 B2
(45) Date of Patent: Nov. 15, 2005

(54) METHOD AND SYSTEM FOR REDUCING MICROBIAL BURDEN ON A FOOD PRODUCT

(75) Inventors: Sally Kay Swart, Rosemount, MN (US); Shaun Patrick Kennedy, North Oaks, MN (US); Thomas L. Harris, Eden Prairie, MN (US)

(73) Assignee: Ecolab Inc., St. Paul, MN (US)

( * ) Notice: Subject to any disclaimer, the term of this patent is extended or adjusted under 35 U.S.C. 154(b) by 81 days.

(21) Appl. No.: 10/043,827

(22) Filed: Jan. 11, 2002

(65) Prior Publication Data

US 2002/0192340 A1 Dec. 19, 2002

Related U.S. Application Data

(60) Provisional application No. 60/265,689, filed on Feb. 1, 2001.

(51) Int. Cl.$^7$ ............................................. A23B 4/015
(52) U.S. Cl. .................. 426/234; 426/240; 426/326; 426/332; 426/335; 426/638; 426/392; 422/22; 422/28
(58) Field of Search ................................. 426/638, 234, 426/237, 240, 248, 324, 326, 332, 335, 392; 422/22, 28, 37

(56) References Cited

U.S. PATENT DOCUMENTS

| | | | |
|---|---|---|---|
| 2,512,640 A | | 6/1950 | Greenspan et al. |
| 3,057,735 A | * | 10/1962 | Ottke et al. .................. 426/2 |
| 3,122,417 A | | 2/1964 | Blaser et al. |
| 3,248,281 A | | 4/1966 | Goodenough |
| 3,350,265 A | | 10/1967 | Rubinstein et al. |
| 3,401,044 A | * | 9/1968 | Corlett et al. .................. 99/217 |
| 3,514,278 A | | 5/1970 | Brink |
| 3,592,658 A | * | 7/1971 | Shults .......................... 99/157 |

(Continued)

FOREIGN PATENT DOCUMENTS

| | | |
|---|---|---|
| AU | 1129746 | 10/1968 |
| DE | 35 43 500 A1 | 6/1987 |
| DE | 197 51 391 A1 | 7/1998 |
| EP | 0 195 619 A2 | 9/1986 |
| EP | 0 233 731 A2 | 8/1987 |
| EP | 0 373 268 A1 | 6/1990 |
| EP | 0 461 700 A1 | 12/1991 |
| EP | 0 569 066 A1 | 11/1993 |
| EP | 0 985 349 A2 | 3/2000 |
| EP | 0 985 349 A3 | 8/2000 |
| FR | 2 321 301 A | 3/1977 |
| FR | 2 324 626 A | 4/1977 |
| JP | 62111669 A * | 5/1987 |
| JP | 11339701 A * | 12/1999 |
| LU | 78 568 A | 4/1978 |
| WO | WO 93/01716 | 2/1993 |
| WO | WO 94/21122 | 9/1994 |
| WO | WO 94/23575 | 10/1994 |
| WO | WO 95/34537 | 12/1995 |
| WO | WO 98/28267 | 7/1998 |
| WO | WO 99/51095 | 10/1999 |

OTHER PUBLICATIONS

Bayliss, C. et al., "The Combined Effect of Hydrogen Peroxide and Ultraviolet Irradiation on Bacterial Spores", *Journal of Applied Bacteriology*, 47:263–269 (1979).

(Continued)

*Primary Examiner*—Drew Becker
(74) *Attorney, Agent, or Firm*—Merchant & Gould P.C.

(57) ABSTRACT

The present invention relates to a method and system for reducing microbial burden on a food product. The method includes contacting the food product with an antimicrobial agent and irradiating the food product. The system includes an applicator adapted and configured for contacting a food product with an antimicrobial agent and an irradiator adapted and configured for irradiating a food product. The antimicrobial agent can be a peroxycarboxylic acid.

12 Claims, 4 Drawing Sheets

U.S. PATENT DOCUMENTS

| | | | |
|---|---|---|---|
| 3,794,739 A | * | 2/1974 | Lee et al. ............... 426/8 |
| 3,895,116 A | | 7/1975 | Herting et al. |
| 3,996,386 A | | 12/1976 | Malkki et al. |
| 4,041,149 A | | 8/1977 | Gaffar et al. |
| 4,051,058 A | | 9/1977 | Bowing et al. |
| 4,051,059 A | | 9/1977 | Bowing et al. |
| 4,129,517 A | | 12/1978 | Eggensperger et al. |
| 4,191,660 A | | 3/1980 | Schreiber et al. |
| 4,244,884 A | | 1/1981 | Hutchins et al. |
| 4,370,199 A | | 1/1983 | Orndorff |
| 4,404,040 A | | 9/1983 | Wang |
| 4,477,438 A | | 10/1984 | Willcockson et al. |
| 4,478,683 A | | 10/1984 | Orndorff |
| 4,501,681 A | | 2/1985 | Groult et al. |
| 4,529,534 A | | 7/1985 | Richardson |
| 4,557,898 A | | 12/1985 | Greene et al. |
| 4,592,488 A | | 6/1986 | Simon et al. |
| 4,613,452 A | | 9/1986 | Sanderson |
| 4,655,781 A | | 4/1987 | Hsieh et al. |
| 4,715,980 A | | 12/1987 | Lopes et al. |
| 4,738,840 A | | 4/1988 | Simon et al. |
| 4,802,994 A | | 2/1989 | Mouché et al. |
| 4,865,752 A | | 9/1989 | Jacobs |
| 4,900,721 A | | 2/1990 | Bansemir et al. |
| 4,906,617 A | | 3/1990 | Jacquet et al. |
| 4,908,306 A | | 3/1990 | Lorincz |
| 4,917,815 A | | 4/1990 | Beilfuss et al. |
| 4,923,677 A | | 5/1990 | Simon et al. |
| 4,937,066 A | | 6/1990 | Vlock |
| 4,943,414 A | | 7/1990 | Jacobs et al. |
| 4,945,110 A | | 7/1990 | Brokken et al. |
| 4,983,411 A | * | 1/1991 | Tanaka et al. ............... 426/234 |
| 4,996,062 A | | 2/1991 | Lehtonen et al. |
| 4,997,571 A | | 3/1991 | Roensch et al. |
| 4,997,625 A | | 3/1991 | Simon et al. |
| 5,004,760 A | | 4/1991 | Patton et al. |
| 5,010,109 A | | 4/1991 | Inoi |
| 5,015,408 A | | 5/1991 | Reuss |
| 5,043,176 A | | 8/1991 | Bycroft et al. |
| 5,069,286 A | | 12/1991 | Roensch et al. |
| 5,084,239 A | | 1/1992 | Moulton et al. |
| 5,093,140 A | | 3/1992 | Watanabe |
| 5,114,178 A | | 5/1992 | Baxter |
| 5,114,718 A | | 5/1992 | Damani |
| 5,122,538 A | | 6/1992 | Lokkesmoe et al. |
| 5,129,824 A | | 7/1992 | Keller |
| 5,130,124 A | | 7/1992 | Merianos et al. |
| 5,139,788 A | | 8/1992 | Schmidt |
| 5,176,899 A | | 1/1993 | Montgomery |
| 5,200,189 A | | 4/1993 | Oakes et al. |
| 5,208,057 A | | 5/1993 | Greenley et al. |
| 5,234,703 A | | 8/1993 | Guthery |
| 5,234,719 A | | 8/1993 | Richter et al. |
| 5,268,003 A | | 12/1993 | Coope et al. |
| 5,292,447 A | | 3/1994 | Venturello et al. |
| 5,314,687 A | | 5/1994 | Oakes et al. |
| 5,336,500 A | | 8/1994 | Richter et al. |
| 5,364,650 A | | 11/1994 | Guthery |
| 5,391,324 A | | 2/1995 | Reinhardt et al. |
| 5,400,382 A | * | 3/1995 | Welt et al. ............... 378/69 |
| 5,409,713 A | | 4/1995 | Lokkesmoe et al. |
| 5,419,908 A | | 5/1995 | Richter et al. |
| 5,435,808 A | | 7/1995 | Holzhauer et al. |
| 5,436,008 A | | 7/1995 | Richter et al. |
| 5,437,868 A | | 8/1995 | Oakes et al. |
| 5,482,726 A | * | 1/1996 | Robinson, Jr. ............... 426/238 |
| 5,489,434 A | | 2/1996 | Oakes et al. |
| 5,494,588 A | | 2/1996 | LaZonby |
| 5,508,046 A | | 4/1996 | Cosentino et al. |
| 5,512,309 A | | 4/1996 | Bender et al. |
| 5,578,134 A | | 11/1996 | Lentsch et al. |
| 5,591,706 A | | 1/1997 | Ploumen |
| 5,595,967 A | | 1/1997 | Miracle et al. |
| 5,597,790 A | | 1/1997 | Thoen |
| 5,603,972 A | * | 2/1997 | McFarland ............... 426/240 |
| 5,616,335 A | | 4/1997 | Nicolle et al. |
| 5,616,616 A | | 4/1997 | Hall et al. |
| 5,632,676 A | | 5/1997 | Kurschner et al. |
| 5,641,530 A | | 6/1997 | Chen |
| 5,656,302 A | | 8/1997 | Cosentino et al. |
| 5,658,467 A | | 8/1997 | LaZonby et al. |
| 5,674,538 A | | 10/1997 | Lokkesmoe et al. |
| 5,674,828 A | | 10/1997 | Knowlton et al. |
| 5,683,724 A | | 11/1997 | Hei et al. |
| 5,712,239 A | | 1/1998 | Knowlton et al. |
| 5,718,910 A | | 2/1998 | Oakes et al. |
| 5,756,139 A | | 5/1998 | Harvey et al. |
| 5,785,867 A | | 7/1998 | LaZonby et al. |
| 5,840,343 A | | 11/1998 | Hall et al. |
| 5,851,483 A | | 12/1998 | Nicolle et al. |
| 5,891,392 A | | 4/1999 | Monticello et al. |
| 5,900,256 A | | 5/1999 | Scoville, Jr. et al. |
| 5,902,619 A | | 5/1999 | Rubow et al. |
| 5,968,539 A | | 10/1999 | Beerse et al. |
| 5,989,611 A | | 11/1999 | Stemmler, Jr. et al. |
| 6,010,729 A | | 1/2000 | Gutzmann et al. ............ 426/321 |
| 6,024,986 A | | 2/2000 | Hei |
| 6,033,705 A | | 3/2000 | Isaacs |
| 6,049,002 A | | 4/2000 | Mattila et al. |
| 6,096,226 A | | 8/2000 | Fuchs et al. |
| 6,096,266 A | | 8/2000 | Duroselle |
| 6,096,348 A | | 8/2000 | Miner et al. |
| 6,099,879 A | * | 8/2000 | Todd, Jr. ............... 426/240 |
| 6,183,807 B1 | * | 2/2001 | Gutzmann et al. ............ 426/652 |
| 6,248,381 B1 | * | 6/2001 | Liberman et al. ............ 426/240 |
| 6,265,006 B1 | * | 7/2001 | Inglis et al. ............... 426/320 |
| 6,514,556 B2 | * | 2/2003 | Hilgren et al. ............ 426/652 |
| 6,551,641 B1 | * | 4/2003 | Terry ............... 426/332 |

OTHER PUBLICATIONS

Bell, K. et al., "Reduction of foodborne micro–organisms on beef carcass tissue using acetic acid, sodium bicarbonate, and hydrogen peroxide spray washes", *Food Microbiology*, vol. 14, pp. 439–448 (1997).

Eggensperger, H., "Disinfectants Based on Peracid–Splitting Compounds", *Zbl. Bakt. Hyg.*, I. Abt. Orig. B 168, pp. 51524 (1979).

Lion C. et al., "New decontaminants. Reaction of peroxyacid esters with toxic insecticides", *Bull. Soc. Chim. Belg.*, vol. 100, No. 7, pp. 555–559 (1991).

Merka, V. et al., "Disinfectant properties of some peroxide compounds.", Abstract No. 67542e, *Chemical Abstracts*, vol. 67 (1967).

Mulder, R.W.A.W. et al., "Research Note: Salmonella Decontamination of Broiler Carcasses with Lactic Acid, L–Cysteine, and Hdrogen Peroxide", *Poultry Science*, vol. 66, pp. 1555–1557 (1987).

Parker, W. et al., "Peroxides. II. Preparation, Characterization and Polarographic Behavior of Longchaing Aliphatic Peracids", *Synthesis and Properties of LongChain Aliphatic Peracids*, vol. 77, pp. 4037–4041 (Aug. 5, 1955).

Parker, W. et al., "Peroxides. IV. Aliphatic Diperacids", *Aliphatic Diperacids*, vol. 79, pp. 1929–1931 (Apr. 20, 1957).

Towle, G. et al., "Industrial Gums polysaccharides and Their Derivatives", Second Edition, Ch. XIX, "Pectin", pp. 429–444 (year unknown).

Armak Chemicals, "NEO–FAT Fatty Acids", *Akzo Chemicals Inc.*, Bulletin No. 86–17 (1986).

Computer search results—Level 1–5 patents (Mar. 1994).

Computer search results from Ecolab Information Center (Jun. 1998).

"Emery® Fatty and Dibasic Acids Specifications and Characteristics", *Emery Industries*, Bulletin 145, (Oct. 1983).

Pfizer Chemical Division, "Pfizer Flocon® Biopolymers for Industrial Uses (xanthan broths)", Data Sheet 679, pp. 1–4 (year unknown).

Copy of International Search Report dated Jan. 30, 2002 (10 pages).

* cited by examiner

METHOD AND SYSTEM FOR REDUCING MICROBIAL BURDEN ON A FOOD PRODUCT

CROSS REFERENCE TO RELATED APPLICATION

This application claims priority to U.S. Provisional Patent Application Ser. No. 60/265,689, filed Feb. 1, 2001, the disclosure of which is incorporated herein by reference.

FIELD OF THE INVENTION

The present invention relates to a method and system for reducing microbial burden on a food product. The method includes contacting the food product with an antimicrobial agent and irradiating the food product. The system includes an applicator adapted and configured for contacting a food product with an antimicrobial agent and an irradiator adapted and configured for irradiating a food product. The antimicrobial agent can be a peroxycarboxylic acid, in one embodiment, a densified fluid peroxycarboxylic acid composition.

BACKGROUND OF THE INVENTION

Irradiation of food products has developed as an industry over a period of approximately 30 years. Use of irradiation is driven by increasing incidence of sickness and death caused by food-borne pathogens. At the present time, FDA regulations have been promulgated for irradiating wheat, wheat powder, potatoes, seasonings, pork, poultry, red meat (e.g. beef and veal), eggs, and produce. These regulations provide for giving absorbed radiation doses to food (other than spices) of up to 100 kilorads. It is expected that eventually many additional foods will be cleared for irradiation for preservation and other beneficial purposes, in addition to disinfestation purposes. A wide spectrum of food products will be covered under such regulations, including ready to eat foods.

At the present time, irradiation of food products is the only commercially viable technology sufficiently effective at destroying harmful microbes or insects on or in a raw or ready to eat product. Nonetheless, consumer sensitivity to the idea of radiation and reaction to the inadequate quality of irradiated food products has slowed commercialization of irradiation. For example, irradiation of meats typically has an immediate negative impact on palatability, depending on the dose used. Meats or meat products that have been irradiated often acquire a characteristic odor and flavor which has been described as irradiation burned, wet dog, or metallic. The higher the dose, the greater the generation of off-flavors and aromas. Irradiation at high doses required for effective reduction of microbes or insects may make the food product unpalatable.

Several methods for reducing objectionable off odors and flavors associated with irradiated meats have been developed. These methods include freezing the meat and irradiating it at very low temperatures; irradiating in the absence of oxygen under vacuum or in the presence of an inert atmosphere; storing the meat products at room temperature after irradiation; and adding an antioxidant, a nitrite, a preservative, or certain other chemical agents, such as mannitol, sodium fumarate, or monosodium glutamate.

Irradiation of food products typically employs one of three types of ionizing radiation: 1) gamma rays from radioisotopes, 2) X-rays generated by energetic electron bombardment on hard metal targets, or 3) direct bombardment with energetic electrons. Gamma and x-ray radiation exhibit similar frequencies and energy; both are electromagnetic waves and physically the same. In fact, low energy gamma rays and X-rays of the same energy differ only in the manner in which the radiation is generated. The former is generated by nuclear processes within a radioactive nucleus, while the later arises from acceleration of energetic electrons by electric (Coulomb) forces from atomic targets.

It is common in the design of irradiators to utilize radioisotopic sources, e.g., Cobalt-60 and Cesium-137. Recently, Cesium-137 sources have been made available through the Department of Energy; and these sources are generally in the form of WESF capsules containing 40–50 kilocuries. A typical apparatus for irradiating a food product places the food product automatically into a thick walled, shielded chamber also housing rods of the radioisotope. Racks of rods provide proper orientation of the isotope for product irradiation. The total dose of gamma radiation received by the food products is determined by exposure time, location of the product within the chamber, and the linear attenuation coefficient of the absorber, which in this case is the food product receiving the radiation. As the emission of gamma-rays from radioactive materials cannot be turned off, the isotopes are submerged in a deep pool of water for safe storage when the irradiator is not in use.

X-rays are produced by high voltages from electrostatic or inductive generators, which accelerate electrons to extremely high energies. After acceleration, the electrons are directed onto a target of a metal having a high atomic number, e.g., tungsten, to produce bremsstrahlung x-rays. There are several types of electron accelerators, such as Van der Graff, betatrons, synchrotrons, and linacs, that are useful for food irradiation. The impact of energetic electrons produces x-rays through two atomic collision processes. First, after collisions, decelerating energetic electrons emit bremsstrahlung. Second, outer bound electrons of the atom replace inner-shell electrons that have been knocked out by incident energetic electrons thus emitting characteristic x-rays. Bremsstrahlung x-rays exhibit energy directly proportional to the energy of incident electrons. Also, as the electron current incident on the target increases, the intensity of x-ray emission will increase proportionally.

Electrically powered x-ray devices advantageously do not employ radioactive materials. Furthermore, X-ray machines can be turned off since they are driven electrically, so they do not require storage in deep pools of water when not in use. This makes X-rays easier to use than radioactivity for irradiation of food products.

Nonetheless, whether conducted with X-rays, radioisotopes, or direct electron beams, irradiation of food products can have the same detrimental effects on consumer acceptance and flavor of the food. The present method and system effectively reduces the microbial burden in or on a food product, while providing a palatable irradiated food product.

SUMMARY OF THE INVENTION

The present invention relates to a method and system for reducing microbial burden on a food product. The method includes contacting the food product with an antimicrobial agent and irradiating the food product. The system includes an applicator adapted and configured for contacting a food product with an antimicrobial agent and an irradiator adapted and configured for irradiating a food product. The antimicrobial agent can include one or more peroxycarboxylic acids, in one embodiment a densified fluid peroxycarboxylic acid composition. The food product can include red meat, poultry, pork, eggs, ready to eat food, fruit, vegetable, wheat, seed, sprout, seasoning, or a combination thereof.

In an embodiment of the method and system, irradiating is accomplished with a quantity of radiation insufficient to acceptably reduce the microbial burden in the absence of contacting with an antimicrobial agent. In an embodiment of the method and system, contacting is accomplished with a quantity of antimicrobial agent insufficient to acceptably reduce the microbial burden in the absence of irradiating. In certain embodiments, contacting and irradiating produce synergistic reduction in microbial burden on the food product.

In one embodiment, the system includes an irradiator coupled to a wash station and an apparatus for transporting a food product between the irradiator and the wash station. For example, a food product transported by conveyor travels through a wash station and then into the irradiator. The wash station can be any of a variety of systems for applying an antimicrobial composition to a food product, such as a spray booth, an immersion tank, a vented vessel containing densified fluid, or the like. Suitable conveyors for transporting a food product through such a wash station and an irradiator include a belt, roller, or overhead conveyor. In such a system, the irradiator can be any type suitable for or that can be adapted for irradiating a food product on or delivered from a conveyor.

DETAILED DESCRIPTION OF THE INVENTION

Definitions

Figure 1:
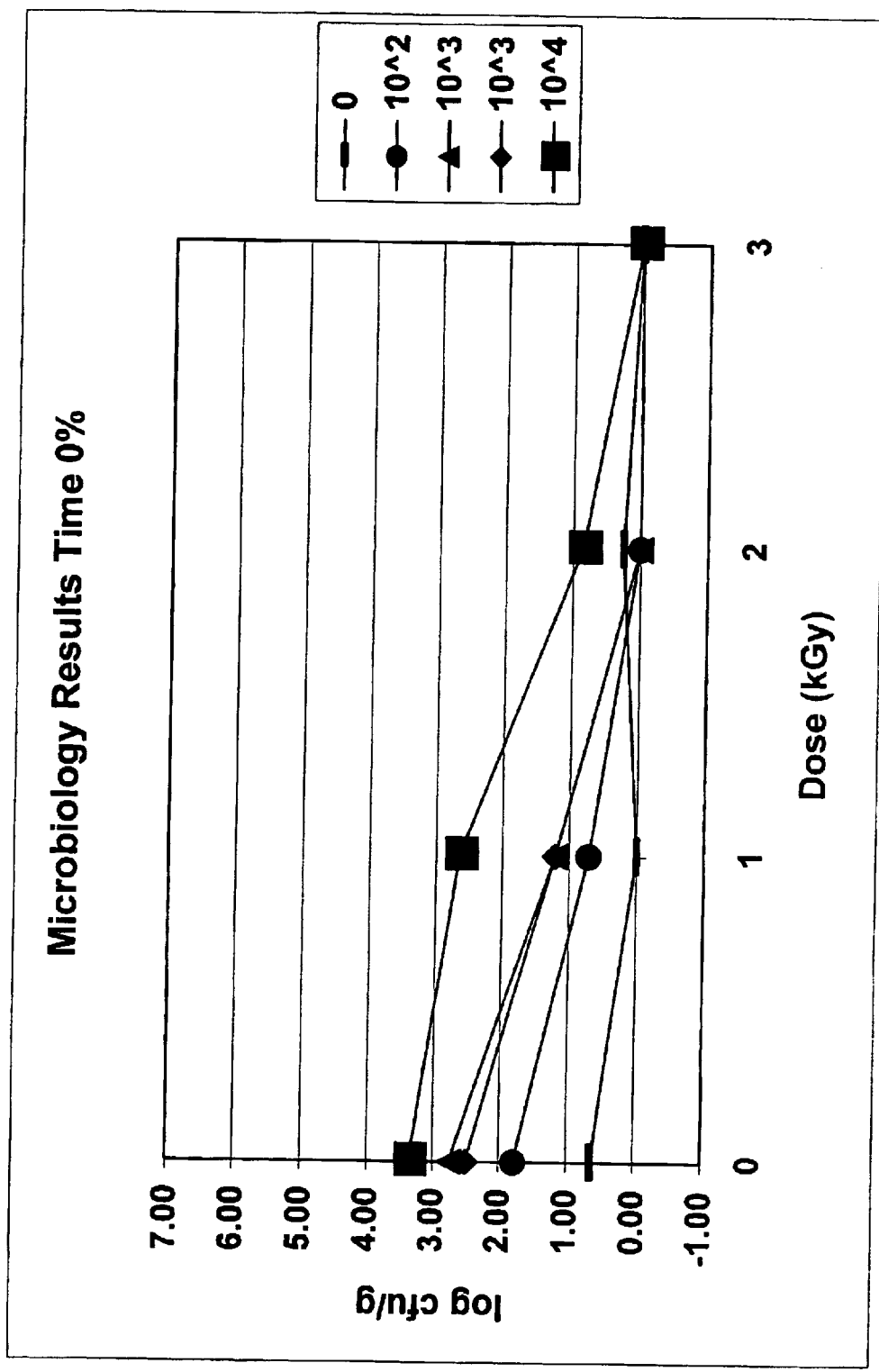
FIG. 1 illustrates the bacteria levels (Log cfu/g) measured at the beginning of product shelf life at each amount of bacteria inoculated as a function of dose of irradiation.

As used herein, Gray(s) (Gr) and kiloGray(s) (kGr) refer to irradiation doses. A Gray refers to treating one kilogram of material with one Joule of energy.

As used herein, the phrase "food product" includes any food substance that might require irradiation and/or treatment with an antimicrobial agent or composition and that is edible with or without further preparation. Food products include meat (e.g. red meat and pork), seafood, poultry, fruits and vegetables, eggs, egg products, ready to eat food, wheat, seeds, sprouts, seasonings, or a combination thereof. The term "produce" refers to food products such as fruits and vegetables and plants or plant-derived materials that are typically sold uncooked and, often, unpackaged, and that can sometimes be eaten raw.

As used herein, the phrase "plant product" includes any plant substance or plant-derived substance that might require irradiation and/or treatment with an antimicrobial agent or composition. Plant products include seeds, nuts, nut meats, cut flowers, plants or crops grown or stored in a greenhouse, house plants, and the like.

As used herein, a processed fruit or vegetable refers to a fruit or vegetable that has been cut, chopped, sliced, peeled, ground, milled, irradiated, frozen, cooked (e.g., blanched, pasteurized), or homogenized. As used herein a fruit or vegetable that has been washed, colored, waxed, hydrocooled, refrigerated, shelled, or had leaves, stems or husks removed is not processed.

As used herein, the phrase "meat product" refers to all forms of animal flesh, including muscle, fat, organs, skin, bones and body fluids and like components that form the animal. Animal flesh includes the flesh of mammals, birds, fishes, reptiles, amphibians, snails, clams, crustaceans, other edible species such as lobster, crab, etc., or other forms of seafood. The forms of animal flesh include, for example, the whole or part of animal flesh, alone or in combination with other ingredients. Typical forms include, for example, processed meats such as cured meats, sectioned and formed products, minced products, finely chopped products, ground meat and products including ground meat, whole products, and the like.

As used herein the term "poultry" refers to all forms of any bird kept, harvested, or domesticated for meat or eggs, and including chicken, turkey, ostrich, game hen, squab, guinea fowl, pheasant, quail, duck, goose, emu, or the like and the eggs of these birds. Poultry includes whole, sectioned, processed, cooked or raw poultry, and encompasses all forms of poultry flesh, by-products, and side products. The flesh of poultry includes muscle, fat, organs, skin, bones and body fluids and like components that form the animal. Forms of animal flesh include, for example, the whole or part of animal flesh, alone or in combination with other ingredients. Typical forms include, for example, processed poultry meat, such as cured poultry meat, sectioned and formed products, minced products, finely chopped products and whole products.

As used herein, the terms "mixed" or "mixture" when used relating to "peroxycarboxylic acid composition" or "peroxycarboxylic acids" refer to a composition or mixture including more than one peroxycarboxylic acid, such as a composition or mixture including peroxyacetic acid and peroxyoctanoic acid.

As used herein, the phrase "densified fluid" refers to a fluid in a critical, subcritical, near critical, or supercritical state. The fluid is generally a gas at standard conditions of one atmosphere pressure and 0° C. As used herein, the phrase "supercritical fluid" refers to a dense gas that is maintained above its critical temperature, the temperature above which it cannot be liquefied by pressure. Supercritical fluids are typically less viscous and diffuse more readily than liquids. Preferably a densified fluid is at, above, or slightly below its critical point. As used herein, the phrase "critical point" is the transition point at which the liquid and gaseous states of a substance merge into each other and represents the combination of the critical temperature and critical pressure for a substance. The critical pressure is a pressure just sufficient to cause the appearance of two phases at the critical temperature. Critical temperatures and pressures have been reported for numerous organic and inorganic compounds and several elements.

As used herein, the terms "near critical" fluid or "subcritical" fluid refer to a fluid material that is typically below the critical temperature of a supercritical fluid, but remains in a fluid state and denser than a typical gas due to the effects of pressure on the fluid. Preferably a subcritical or near critical fluid is at a temperature and/or pressure just below its critical point. For example, a subcritical or near critical fluid can be below its critical temperature but above its critical pressure, below its critical pressure but above its critical temperature, or below both its critical temperature and pressure. The terms near critical and subcritical do not refer to materials in their ordinary gaseous or liquid state.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can effect two kinds of microbial cell damage. The first is a lethal, irreversible action resulting in complete microbial cell destruction or incapacitation. The second type of cell damage is reversible, such that if the organism is rendered free of the agent, it can again multiply. The former is termed bacteriocidal and the later, bacteriostatic. A sanitizer and a disinfectant are, by definition, agents which provide antibacterial or bacteriocidal activity. In contrast, a preservative is generally described as an inhibitor or bacteriostatic composition.

For the purpose of this patent application, successful microbial reduction is achieved when the microbial populations are reduced by at least about 0.3–1 $\log_{10}$. In this industry, such a population reduction is the minimum acceptable for the processes. Any increased reduction in microbial population is an added benefit that provides higher levels of protection for processed food product.

As used herein, a composition or combination "consisting essentially" of certain ingredients refers to a composition including those ingredients and lacking any ingredient that materially affects the basic and novel characteristics of the composition or method. The phrase "consisting essentially of" excludes from the claimed compositions and methods: a coupling agent; an ingredient that cannot be employed in food products or in food wash, handling, or processing according to U.S. government rules or regulations; and/or a peroxycarboxylic acid or carboxylic acid with 10 or more carbon atoms; unless such an ingredient is specifically listed after the phrase.

Method and System

The present invention relates to a method and system for reducing microbial burden on a food product. The method includes contacting the food product with an antimicrobial agent and irradiating the food product, in any order. The system includes an applicator adapted and configured for contacting a food product with an antimicrobial agent and an irradiator adapted and configured for irradiating a food product.

In an embodiment of the method and system, irradiating is accomplished with a quantity of radiation insufficient to acceptably reduce the microbial burden in the absence of contacting with an antimicrobial agent. In this embodiment, the quantity of antimicrobial agent can be at a level effective to acceptably reduce the microbial burden in the absence of irradiating, or at a reduced level insufficient to acceptably reduce the microbial burden in the absence of irradiating. In certain embodiments, contacting and irradiating produce synergistic reduction in microbial burden on the food product.

For example, in an embodiment of the present system and method the amount of irradiation applied to the foodstuff can be reduced from 100% of the $D_{max}$ allowed under regulations to about 90, about 80, about 70, about 60, about 50, about 40, about 30, about 20, about 10, or about 5 percent of this value, or to less than such a value. Preferably, the amount of irradiation can be reduced to less than about 50% of the $D_{max}$, for example, to about 40, about 30, about 20, about 10, or about 5 percent of this value, or to less than such a value. The amount can also be any of these values not modified by about.

For example, in an embodiment of the present system and method the amount of irradiation applied to the foodstuff can be reduced from 1 kGy to about 0.9, about 0.8, about 0.7, about 0.6, about 0.5, about 0.4, about 0.3, about 0.2, about 0.1, or about 0.05 kGy, or to less than such a value. Preferably, the amount of irradiation can be reduced to less than about 0.5 kGy, for example, to about 0.4, about 0.3, about 0.2, about 0.1, or about 0.05 kGy, or to less than such a value. The amounts can also be any of these values not modified by about. 1 kGy is an approved maximum level for foodstuffs such as pork (for reducing trichinosis), fresh vegetables, and fruit, and these reduced levels of irradiation can be employed for reducing the microbial burden on such foodstuffs in combination with treatment with an antimicrobial agent.

For example, in an embodiment of the present system and method the amount of irradiation applied to the foodstuff can be reduced from 3 kGy to about 2.7, about 2.4, about 2.1, about 1.8, about 1.5, about 1.2, about 0.9, about 0.6, about 0.3, or about 0.15 kGy, or to less than such a value. Preferably, the amount of irradiation can be reduced to less than about 1.5 kGy, for example, to about 1.2, about 0.9, about 0.6, about 0.3, or about 0.15 kGy, or to less than such a value. The amounts can also be any of these values not modified by about. 3 kGy is an approved maximum level for foodstuffs such as fresh or frozen poultry, poultry meat, and eggs in their shell, and these reduced levels of irradiation can be employed for reducing the microbial burden on such foodstuffs in combination with treatment with an antimicrobial agent.

For example, in an embodiment of the present system and method the amount of irradiation applied to the foodstuff can be reduced from 4.5 kGy to about 4, about 3.5, about 3, about 2.5, about 2, about 1.5, about 1, about 0.5, or about 0.25 kGy, or to less than such a value. Preferably, the amount of irradiation can be reduced to less than about 2 kGy, for example, to about 1.5, about 1, about 0.5, or about 0.25 kGy, or to less than such a value. The amounts can also be any of these values not modified by about. 4.5 kGy is an approved maximum level for foodstuffs such as fresh red meat (including pork), and these reduced levels of irradiation can be employed for reducing the microbial burden on such foodstuffs in combination with treatment with an antimicrobial agent.

For example, in an embodiment of the present system and method the amount of irradiation applied to the foodstuff can be reduced from 7 kGy to about 6, about 5, about 4, about 3, about 2, about 1, or about 0.5 kGy, or to less than such a value. Preferably, the amount of irradiation can be reduced to less than about 3 kGy, for example, to about 2, about 1, or about 0.5 kGy, or to less than such a value. The amounts can also be any of these values not modified by about. 7 kGy is an approved maximum level for foodstuffs such as frozen red meat (including pork), and these reduced levels of irradiation can be employed for reducing the microbial burden on such foodstuffs in combination with treatment with an antimicrobial agent.

For example, in an embodiment of the present system and method the amount of irradiation applied to the foodstuff can be reduced from 10 kGy to about 9, about 8, about 7, about 6, about 5, about 4, about 3, about 2, about 1, or about 0.5 kGy, or to less than such a value. Preferably, the amount of irradiation can be reduced to less than about 5 kGy, for example, to about 4, about 3, about 2, about 1, or about 0.5 kGy, or to less than such a value. The amounts can also be any of these values not modified by about. 10 kGy is an approved maximum level for food additives or ingredients such as enzymes, and these reduced levels of irradiation can be employed for reducing the microbial burden of such food additives or ingredients in combination with treatment with an antimicrobial agent.

For example, in an embodiment of the present system and method the amount of irradiation applied to the foodstuff can be reduced from 25 kGy to about 20, about 15, about 10, about 5, or about 2.5, or to less than such a value. Preferably, the amount of irradiation can be reduced to less than about 10 kGy, for example, to about 8, about 5, or about 3 kGy, or to less than such a value. The amounts can also be any of these values not modified by about. 25 kGy is an approved maximum level for feedstuffs such as poultry feed, and these reduced levels of irradiation can be employed for reducing the microbial burden on foodstuffs in combination with treatment with an antimicrobial agent.

For example, in an embodiment of the present system and method the amount of irradiation applied to the foodstuff can be reduced from 30 kGy to about 27, about 24, about 21, about 18, about 15, about 12, about 9, about 6, about 3, or about 1.5 kGy, or to less than such a value. Preferably, the amount of irradiation can be reduced to less than about 15 kGy, for example, to about 12, about 9, about 6, about 3, or about 1.5 kGy, or to less than such a value. The amounts can also be any of these values not modified by about. 30 kGy is an approved maximum level for foodstuffs such as spices, dried vegetable seasonings, or herbs and spices, and these reduced levels of irradiation can be employed for reducing the microbial burden on such foodstuffs in combination with treatment with an antimicrobial agent.

In an embodiment of the method and system, contacting is accomplished with a quantity of antimicrobial agent insufficient to acceptably reduce the microbial burden in the absence of irradiating. In this embodiment, the quantity of irradiation is preferably at a reduced level insufficient to acceptably reduce the microbial burden in the absence of contacting with an antimicrobial agent. In certain embodiments, contacting and irradiating produce synergistic reduction in microbial burden on the food product.

For example, in an embodiment of the present system and method the concentration of antimicrobial agent can be reduced from 100% of the maximum concentration allowed or the concentration required under regulations to about 90, about 80, about 70, about 60, about 50, about 40, about 30, about 20, about 10, or about 5 percent of this value, or to a range bounded by such a value. Preferably, the concentration of antimicrobial agent can be reduced to less than about 70, about 60, about 50, about 40, or about 30 percent of the maximum concentration allowed or the concentration required, or to a range bounded by such a value. The concentration can also be any of these values not modified by about.

For example, in an embodiment of the present system and method the concentration of a peroxide antimicrobial agent such as hydrogen peroxide applied to the foodstuff can be reduced from about 60 ppm (e.g., 59 ppm) to about 50, about 40, about 30, about 20, or about 10 ppm, or to a range bounded by such a value. Preferably, the concentration of antimicrobial agent can be reduced to about 40 ppm or to about 30 ppm, or to a range bounded by such a value. The concentrations can also be any of these values not modified by about. About 60 ppm (e.g., 59 ppm) is an approved level for treating or washing processed fruits or vegetables with a peroxide antimicrobial agent such as hydrogen peroxide, and these reduced levels of antimicrobial agent can be employed for reducing the microbial burden on such foodstuffs in combination with irradiation.

For example, in an embodiment of the present system and method the concentration of a peroxide antimicrobial agent such as hydrogen peroxide applied to the foodstuff can be reduced from about 75 ppm to about 60, about 50, about 40, about 30, about 20, or about 10 ppm, or to a range bounded by such a value. Preferably, the concentration of antimicrobial agent can be reduced to about 50, about 40, or about 30 ppm, or to a range bounded by such a value. The concentrations can also be any of these values not modified by about. 75 ppm is an approved level for treating or washing red meat carcasses with a peroxide antimicrobial agent such as hydrogen peroxide, and these reduced levels of antimicrobial agent can be employed for reducing the microbial burden on such foodstuffs in combination with irradiation.

For example, in an embodiment of the present system and method the concentration of a peroxide antimicrobial agent such as hydrogen peroxide applied to the foodstuff can be reduced from about 110 ppm to about 90, about 70, about 50, about 30, or about 20 ppm, or to a range bounded by such a value. Preferably, the concentration of antimicrobial agent can be reduced to about 70, about 50, about 40, or about 30 ppm, or to a range bounded by such a value. The concentrations can also be any of these values not modified by about. 110 ppm is an approved level for treating or washing poultry parts, poultry carcasses, or poultry organs with a peroxide antimicrobial agent such as hydrogen peroxide, and these reduced levels of antimicrobial agent can be employed for reducing the microbial burden on such foodstuffs in combination with irradiation.

For example, in an embodiment of the present system and method the concentration of a peroxycarboxylic acid antimicrobial agent such as peroxyacetic acid applied to the foodstuff can be reduced from about 80 ppm to about 70, about 60, about 50, about 40, about 30, about 20, or about 10 ppm, or to a range bounded by such a value. Preferably, the concentration of antimicrobial agent can be reduced to about 60, about 50, about 40, about 30 ppm, or to a range bounded by such a value. The concentrations can also be any of these values not modified by about. 80 ppm is an approved level for treating or washing processed fruits or vegetables with a peroxycarboxylic acid antimicrobial agent such as peroxyacetic acid, and these reduced levels of antimicrobial agent can be employed for reducing the microbial burden on such foodstuffs in combination with irradiation. Peroxyacetic acid compositions preferably also include peroxyoctanoic acid.

For example, in an embodiment of the present system and method the concentration of a peroxycarboxylic acid antimicrobial agent such as peroxyacetic acid applied to the foodstuff can be reduced from about 220 ppm to about 200, about 180, about 160, about 140, about 120, about 100, about 80, about 60, about 40, or about 20 ppm, or to a range bounded by such a value. Preferably, the concentration of antimicrobial agent can be reduced to about 180, about 160, about 140, about 120, about 100, or about 80 ppm, or to a range bounded by such a value. The concentrations can also be any of these values not modified by about. 220 ppm is an approved level for treating or washing red meat carcasses, poultry parts, poultry carcasses, or poultry organs with of a peroxycarboxylic acid antimicrobial agent such as peroxyacetic acid, and these reduced levels of antimicrobial agent can be employed for reducing the microbial burden on such foodstuffs in combination with irradiation. Peroxyacetic acid compositions preferably also include peroxyoctanoic acid.

For example, in an embodiment of the present system and method the concentration of a halogen containing antimicrobial agent such as chlorine dioxide applied to the foodstuff can be reduced from about 3 ppm to about 2.7, about 2.4, about 2.1, about 1.8, about 1.5, about 1.2, about 0.9, about 0.6, or about 0.3 ppm, or to a range bounded by such a value. Preferably, the concentration of antimicrobial agent can be reduced to about 2.1, about 1.8, about 1.5, about 1.2, or about 0.9 ppm, or to a range bounded by such a value. The concentrations can also be any of these values not modified by about. 3 ppm is an approved level for treating or washing poultry during processing and processed fruits or vegetables with of a halogen containing antimicrobial agent such as chlorine dioxide, and these reduced levels of antimicrobial agent can be employed for reducing the microbial burden on such foodstuffs in combination with irradiation.

For example, in an embodiment of the present system and method the concentration of a condensed phosphate antimicrobial agent such as trisodium phosphate applied to the foodstuff can be reduced from about 12 wt-% to about 11, about 10, about 9, about 8, about 7, about 6, about 5, about 4, about 3, about 2, or about 1 wt-%, or to a range bounded by such a value. Preferably, the concentration of antimicrobial agent can be reduced to about 9, about 8, about 7, about 6, about 5 wt-%, or to a range bounded by such a value. For example, in an embodiment of the present system and method the concentration of a condensed phosphate antimicrobial agent such as trisodium phosphate applied to the foodstuff can be reduced from about 8 wt-% to about 7, about 6, about 5, about 4, about 3, about 2, or about 1 wt-%, or to a range bounded by such a value. Preferably, the concentration of antimicrobial agent can be reduced to about 6, about 5, about 4, or about 3 wt-%, or to a range bounded by such a value. Concentrations of a condensed phosphate antimicrobial agent such as trisodium phosphate between 8 and 12 wt-% can be analogously reduced. The concentrations can also be any of these values not modified by about. 8–12 wt-% is an approved level for treating or washing raw, chilled poultry carcasses with a condensed phosphate antimicrobial agent such as trisodium phosphate, and these reduced levels of antimicrobial agent can be employed for reducing the microbial burden on such foodstuffs in combination with irradiation.

In an embodiment of the method and system, irradiating is accomplished with a quantity of radiation insufficient to acceptably reduce the microbial burden in the absence of contacting with an antimicrobial agent and contacting is accomplished with a quantity of antimicrobial agent sufficient or insufficient to acceptably reduce the microbial burden in the absence of irradiating. In certain embodiments, contacting and irradiating produce synergistic reduction in microbial burden on the food product.

For example, in an embodiment of the present system and method the amount of irradiation applied to the foodstuff can be reduced from 100% of the $D_{max}$ allowed under regulations to about 90, about 80, about 70, about 60, about 50, about 40, about 30, about 20, about 10, or about 5 percent of this value, or to less than such a value. With these reduced amounts of irradiation, preferred amounts of antimicrobial agent include 100% of the maximum concentration allowed or the concentration required under regulations to about 90, about 80, about 70, about 60, about 50, about 40, about 30, about 20, about 10, or about 5 percent of this value, or to a range bounded by such a value. Preferably, the amount of irradiation can be reduced to less than about 50% of the $D_{max}$, for example, to about 40, about 30, about 20, about 10, or about 5 percent of this value, or to less than such a value, and the concentration of antimicrobial agent can be reduced to about 70, about 60, about 50, about 40, or about 30 percent of the maximum concentration allowed or the concentration required, or to a range bounded by such a value. The amount or concentration can be any of these values not modified by about.

For example, in an embodiment of the present system and method the amount of irradiation applied to the foodstuff can be reduced from 1 kGy to about 0.9, about 0.8, about 0.7, about 0.6, about 0.5, about 0.4, about 0.3, about 0.2, about 0.1, or about 0.05 kGy, or to less than such a value. Preferably, the amount of irradiation can be reduced to less than about 0.5 kGy, for example, to about 0.4, about 0.3, about 0.2, about 0.1, or about 0.05 kGy, or to less than such a value. With such an amount of irradiation, the foodstuff can be treated with about 60 ppm (e.g., 59 ppm), about 50, about 40, about 30, about 20, or about 10 ppm (preferably about 40 ppm or to about 30 ppm), or to a range bounded by such a value, of a peroxide antimicrobial agent such as hydrogen peroxide. With such an amount of irradiation, the foodstuff can be treated with about 80 ppm, about 70, about 60, about 50, about 40, about 30, about 20, or about 10 ppm (preferably about 60, about 50, about 40, or about 30 ppm), or to a range bounded by such a value, of a peroxycarboxylic acid antimicrobial agent such as peroxyacetic acid. With such an amount of irradiation, the foodstuff can be treated with about 3 ppm, about 2.7, about 2.4, about 2.1, about 1.8, about 1.5, about 1.2, about 0.9, about 0.6, or about 0.3 ppm (preferably about 2.1, about 1.8, about 1.5, about 1.2, or about 0.9 ppm), or to a range bounded by such a value, of a halogen containing antimicrobial agent such as chlorine dioxide. Preferably, the foodstuff is pork (for reducing trichinosis), fresh vegetables, fruit, processed fruits, or processed vegetables. The amounts or concentrations can be any of these values not modified by about.

For example, in an embodiment of the present system and method the amount of irradiation applied to the foodstuff can be reduced from 3 kGy to about 2.7, about 2.4, about 2.1, about 1.8, about 1.5, about 1.2, about 0.9, about 0.6, about 0.3, or about 0.15 kGy, or to less than such a value. Preferably, the amount of irradiation can be reduced to less than about 1.5 kGy, for example, to about 1.2, about 0.9, about 0.6, about 0.3, or about 0.15 kGy, or to less than such a value. With such an amount of irradiation, the foodstuff can be treated with about 110 ppm, about 90, about 70, about 50, about 30, or about 20 ppm (preferably about 70, about 50, about 40, or about 30 ppm), or to a range bounded by such a value, of a peroxide antimicrobial agent such as hydrogen peroxide. With such an amount of irradiation, the foodstuff can be treated with about 220 ppm, about 200, about 180, about 160, about 140, about 120, about 100, about 80, about 60, about 40, or about 20 ppm (preferably about 180, about 160, about 140, about 120, about 100, or about 80 ppm), or to a range bounded by such a value, of a peroxycarboxylic acid antimicrobial agent such as peroxyacetic acid. With such an amount of irradiation, the foodstuff can be treated with about 3 ppm, about 2.7, about 2.4, about 2.1, about 1.8, about 1.5, about 1.2, about 0.9, about 0.6, or about 0.3 ppm (preferably about 2.1, about 1.8, about 1.5, about 1.2, or about 0.9 ppm), or to a range bounded by such a value, of a halogen containing antimicrobial agent such as chlorine dioxide. With such an amount of irradiation, the foodstuff can be treated with about 12 wt-%, about 11, about 10, about 9, about 8, about 7, about 6, about 5, about 4, about 3, about 2, or about 1 wt-% (preferably about 9, about 8, about 7, about 6, about 5 wt-%), or to a range bounded by such a value, of a condensed phosphate antimicrobial agent such as trisodium phosphate. With such an amount of irradiation, the foodstuff can be treated with about 8 wt-%, about 7, about 6, about 5, about 4, about 3, about 2, or about 1 wt-% (preferably about 6, about 5, about 4 or about 3 wt-%), or to a range bounded by such a value, of a condensed phosphate antimicrobial agent such as trisodium phosphate. Concentrations of a condensed phosphate antimicrobial agent such as trisodium phosphate between 8 and 12 wt-% can be analogously reduced. Preferably, the foodstuff is fresh or frozen poultry, poultry during processing, poultry meat, poultry parts, poultry carcasses (e.g., raw, chilled poultry carcasses), poultry organs, or eggs in their shell. The amounts or concentrations can be any of these values not modified by about.

For example, in an embodiment of the present system and method the amount of irradiation applied to the foodstuff can be reduced from 4.5 kGy to about 4, about 3.5, about 3, about 2.5, about 2, about 1.5, about 1, about 0.5, or about 0.25 kGy, or to less than such a value. Preferably, the amount of irradiation can be reduced to less than about 2 kGy, for example, to about 1.5, about 1, about 0.5, or about 0.25 kGy, or to less than such a value. For example, the amount of irradiation applied to the foodstuff can be reduced from 7 kGy to about 6, about 5, about 4, about 3, about 2, about 1, or about 0.5 kGy, or to less than such a value. Preferably, the amount of irradiation can be reduced to less than about 3 kGy, for example, to about 2, about 1, or about 0.5 kGy, or to less than such a value. With such an amount of irradiation, the foodstuff can be treated with about 75 ppm, about 60, about 50, about 40, about 30, about 20, or about 10 ppm, (preferably about 50, about 40, or about 30 ppm), or to a range bounded by such a value, of a peroxide antimicrobial agent such as hydrogen peroxide. With such an amount of irradiation, the foodstuff can be treated with about 220 ppm, about 200, about 180, about 160, about 140, about 120, about 100, about 80, about 60, about 40, or about 20 ppm (preferably about 180, about 160, about 140, about 120, about 100, or about 80 ppm), or to a range bounded by such a value, of a peroxycarboxylic acid antimicrobial agent such as peroxyacetic acid. Preferably, the foodstuff is fresh red meat (including pork), frozen red meat (including pork), or red meat carcasses. The amounts or concentrations can be any of these values not modified by about.

Contacting a Food Product with an Antimicrobial Agent

The present method and system provide for contacting a food product with an antimicrobial agent employing any method or apparatus suitable for applying an antimicrobial agent, either before or after irradiating. For example, the method and system of the invention can contact the food product a vented densified fluid antimicrobial composition, a spray of an antimicrobial agent, by immersion in the antimicrobial agent, by foam or gel treating with the antimicrobial agent, or the like. Contact with a gas, a spray, a foam, a gel, or by immersion can be accomplished by a variety of methods known to those of skill in the art for applying antimicrobial agents to food.

The present methods require a certain minimal contact time of the composition with food product for occurrence of significant antimicrobial effect. The contact time can vary with concentration of the use composition, method of applying the use composition, temperature of the use composition, amount of soil on the food product, number of microorganisms on the food product, type of antimicrobial agent, or the like. Preferably the exposure time is at least about 5 to about 15 seconds.

A preferred method for washing food product employs a pressure spray including the antimicrobial agent. During application of the spray solution on the food product, the surface of the food product can be moved with mechanical action, preferably agitated, rubbed, brushed, etc. Agitation can be by physical scrubbing of the food product, through the action of the spray solution under pressure, through sonication, or by other methods. Agitation increases the efficacy of the spray solution in killing micro-organisms, perhaps due to better exposure of the solution into the crevasses or small colonies containing the micro-organisms. The spray solution, before application, can also be heated to a temperature of about 15 to 20 C., preferably about 20 to 60° C. to increase efficacy. The spray antimicrobial composition can be left on the food product for a sufficient amount of time to suitably reduce the population of microorganisms, and then rinsed, drained, or evaporated off the food product.

Application of the material by spray can be accomplished using a manual spray wand application, an automatic spray of food product moving along a production line using multiple spray heads to ensure complete contact, or other spray apparatus. One preferred automatic spray application involves the use of a spray booth. The spray booth substantially confines the sprayed composition to within the booth. The production line moves the food product through the entryway into the spray booth in which the food product is sprayed on all its exterior surfaces with sprays within the booth. After a complete coverage of the material and drainage of the material from the food product within the booth, the food product can then exit the booth. The spray booth can include steam jets that can be used to apply the antimicrobial compositions of the invention. These steam jets can be used in combination with cooling water to ensure that the treatment reaching the food product surface is less than 65° C., preferably less than 60° C. The temperature of the spray on the food product is important to ensure that the food product is not substantially altered (cooked) by the temperature of the spray. The spray pattern can be virtually any useful spray pattern.

Immersing a food product in a liquid antimicrobial composition can be accomplished by any of a variety of methods known to those of skill in the art. For example, the food product can be placed into a tank or bath containing the antimicrobial composition. Alternatively, the food product can be transported or processed in a flume of the antimicrobial composition. The washing solution is preferably agitated to increase the efficacy of the solution and the speed at which the solution reduces micro-organisms accompanying the food product. Agitation can be obtained by conventional methods, including ultrasonics, aeration by bubbling air through the solution, by mechanical methods, such as strainers, paddles, brushes, pump driven liquid jets, or by combinations of these methods. The washing solution can be heated to increase the efficacy of the solution in killing micro-organisms. After the food product has been immersed for a time sufficient for the desired antimicrobial effect, the food product can be removed from the bath or flume and the antimicrobial composition can be rinsed, drained, or evaporated off the food product.

In another alternative embodiment of the present invention, the food product can be treated with a foaming version of the composition. The foam can be prepared by mixing foaming surfactants with the washing solution at time of use. The foaming surfactants can be nonionic, anionic or cationic in nature. Examples of useful surfactant types include, but are not limited to the following: alcohol ethoxylates, alcohol ethoxylate carboxylate, amine oxides, alkyl sulfates, alkyl ether sulfate, sulfonates, quaternary ammonium compounds, alkyl sarcosines, betaines and alkyl amides. The foaming surfactant is typically mixed at time of use with the washing solution. Use solution levels of the foaming agents is from about 50 ppm to about 2.0 wt-%. At time of use, compressed air can be injected into the mixture, then applied to the food product surface through a foam application device such as a tank roamer or an aspirated wall mounted roamer.

In another alternative embodiment of the present invention, the food product can be treated with a thickened or gelled version of the composition. In the thickened or gelled state the washing solution remains in contact with the food product surface for longer periods of time, thus increasing the antimicrobial efficacy. The thickened or gelled solution will also adhere to vertical surfaces. The composition or the washing solution can be thickened or gelled using existing technologies such as: xanthan gum, polymeric thickeners, cellulose thickeners, or the like. Rod micelle forming systems such as amine oxides and anionic counter ions could also be used. The thickeners or gel forming agents can be used either in the concentrated product or mixing with the washing solution, at time of use. Typical use levels of thickeners or gel agents range from about 100 ppm to about 10 wt-%.

Suitable methods for applying an antimicrobial composition to a food product are described in the U.S. patent application Ser. No. 09/738,806 entitled METHOD AND COMPOSITION FOR WASHING POULTRY DURING PROCESSING, which was filed Dec. 15, 2000. Additional suitable methods for contacting a food product with an antimicrobial composition are described in U.S. patent application Ser. No. 09/614,631 filed Jul. 12, 2000 and entitled METHOD AND COMPOSITION FOR INHIBITION OF MICROBIAL GROWTH IN AQUEOUS FOOD TRANSPORT AND PROCESS STREAMS. These two patent applications are incorporated herein by reference for disclosure of these methods.

The food product can be treated with antimicrobial agent either before or after irradiating. When treatment with the antimicrobial agent precedes irradiating, any of a variety of processing or handling steps can be conducted between irradiating and treating with the antimicrobial agent. For example, after applying the antimicrobial agent, the antimicrobial agent can be removed by drying, draining, or rinsing the food product. The food product can also be processed by cutting, washing, peeling, skinning, boning, cooking, grinding, emulsifying, or the like, or a combination thereof. In addition, the food product can be packaged before irradiating.

Contact with an antimicrobial agent can be effective for washing or sanitizing a food product without additional procedures. According to the present invention, the combination of irradiating the food product and contacting it with an antimicrobial agent, can increase the effectiveness of the antimicrobial agent, irradiating, or both. For example, the combination can result in a greater reduction in the microbial burden at the same level of antimicrobial agent, a greater reduction in the microbial burden at a reduced level of antimicrobial agent, or suitable reductions in microbial burden at a reduced, or previously ineffective, level of antimicrobial agent. Preferably, the amount of or treatment time with the antimicrobial agent can be reduced to a level that has no unacceptable effects on the food product. Thus, the present invention provides a method for enhancing the effect of an antimicrobial agent including treating the food product with an antimicrobial agent and irradiating. In certain circumstances, the combination of irradiating and treatment with an antimicrobial agent can result in a synergistic, or greater than additive, reduction in microbial burden.

The level of antimicrobial agent required for a desired effect in combination with irradiation can be determined by any of several methods. For example, food product samples can each be exposed to different amounts of antimicrobial agent but a fixed amount of or treatment time with irradiation. Then the food product samples can be evaluated for the amount of antimicrobial agent that yields the desired antimicrobial effect, and, preferably, for desired organoleptic qualities. The amount of antimicrobial agent required for antimicrobial effect is reduced with effective antimicrobial irradiation. Such a titration with antimicrobial agent can be conducted at several amounts of or treatment times with irradiation, yielding a matrix of treatment results. Such a matrix yields a quantitative assessment of the amount of antimicrobial treatment required at various levels of irradiation to achieve a desired antimicrobial effect, and, optionally, desired organoleptic qualities. Synergy can be evaluated from such matrices using methods known to those of skill in the art.

Irradiating a Food Product

The present method and system provide for irradiating a food product employing any method or apparatus known in the art for irradiating a food product, either before or after treatment with an antimicrobial agent. For example, irradiating can be accomplished employing gamma-radiation, X-rays, or an electron beam. Gamma-radiation can be produced by either cobalt-60 or cesium-137. X-rays, which are the same as lower-energy gamma-radiation, are typically produced by electron bombardment of a hard metal target. Preferred methods for irradiating a food product include X-ray production by electron beam bombardment of tungsten or tantalum, single or double sided electron beam irradiation, or gamma irradiation from isotopes such as $Ce^{137}$ or $Co^{60}$.

Irradiating can occur either before or after exposing the food product to an antimicrobial agent. When irradiating precedes treatment with an antimicrobial agent, any of a variety of steps can occur between irradiating and treating. For example, the food product can be processed, cooled, warmed, transported, aged, and the like, or a combination thereof. Preferably, any process between irradiating and antimicrobial treatment prepares the food product for exposure to the antimicrobial agent.

Irradiating can be effective for reducing the microbial burden in or sanitizing a food product without additional procedures. However, the radiation exposure that effectively reduces the microbial burden typically results in unacceptable alteration of the appearance, texture, taste, smell, or other organoleptic feature of the food product. According to the present invention, the combination of irradiating the food product and contacting it with an antimicrobial agent can increase the effectiveness of irradiating, of the antimicrobial agent, or both. For example, the combination can result in a greater reduction in the microbial burden at a given level of irradiation, a greater reduction in the microbial burden at a reduced level of radiation, or suitable reductions in microbial burden at a reduced, or previously ineffective, radiation level. Preferably, the amount of or treatment time with radiation can be reduced to a level that has minimal, preferably no, unacceptable effects on the food product. Avoidable unacceptable effects include bleaching, bloating, off-flavor, color change, off odor, texture change, and the like. Thus, the present invention provides a method for enhancing the effect of irradiating a food product including treating the food product with an antimicrobial agent and irradiating. In certain circumstances, the combination of irradiating and treatment with an antimicrobial agent can result in a synergistic, or greater than additive, reduction in microbial burden.

The quantity of or treatment time with irradiation required for a desired effect in combination with an antimicrobial agent can be determined by any of several methods. For example, food product samples can each be exposed to different amounts of irradiation but a fixed level of antimicrobial agent. Then the food product samples can be evaluated for the amount of irradiation that yields the desired antimicrobial effect, and, preferably, for desired organoleptic qualities. The amount of or treatment time with irradiation required for the desired antimicrobial effect is reduced with effective treatment with an antimicrobial agent. Such a titration with irradiation can be conducted at several levels of treatment with antimicrobial agent, yielding a matrix of treatment results. Such a matrix yields a quantitative assessment of the amount of irradiation required at various levels of treatment with antimicrobial treatment to achieve a desired antimicrobial effect, and, optionally, desired organoleptic qualities. Synergy can be evaluated from such matrices using methods known to those of skill in the art.

Additional Forms of Radiation

Other forms or combinations of electromagnetic radiation can also be employed in certain embodiments of the method and systems. For example, irradiating can include exposing the food product to a magnetic field, radio waves, or a combination thereof. One preferred combination of magnetic field and radio wave irradiation is nuclear magnetic resonance irradiation. The strength, orientation, and pulsing of the magnetic field and the frequency and intensity of the radio wave irradiation can be selected for antimicrobial efficacy. Apparatus for generating a combination of magnetic field and radio waves can employ components such as those in a nuclear magnetic resonance machine.

In yet another embodiment, the food product can be exposed to ultraviolet light. The strength, duration, and wavelength of the exposure to ultraviolet light can be selected for antimicrobial efficacy. Preferably, the ultraviolet light is long wave ultraviolet light, short wave ultraviolet light, or a combination thereof. Suitable sources of ultraviolet light include an ultraviolet light bulb.

Peroxycarboxylic Acid Antimicrobial Composition

Among other constituents, the composition of the present invention includes a carboxylic acid. Generally, carboxylic acids have the formula R—COOH wherein the R can represent any number of different groups including aliphatic groups, alicyclic groups, aromatic groups, heterocyclic groups, all of which can be saturated or unsaturated as well as substituted or unsubstituted. Carboxylic acids can have one, two, three, or more carboxyl groups. The composition and methods of the invention can employ carboxylic acids containing as many as 18 carbon atoms. Examples of suitable carboxylic acids include formic, acetic, propionic, butanoic, pentanoic, hexanoic, heptanoic, octanoic, nonanoic, decanoic, undecanoic, dodecanoic, lactic, maleic, ascorbic, citric, hydroxyacetic, neopentanoic, neoheptanoic, neodecanoic, oxalic, malonic, succinic, glutaric, adipic, pimelic and subric acid. Carboxylic acids which are generally useful are those having one or two carboxyl groups where the R group is a primary alkyl chain having a length of $C_2$ to $C_{12}$. The primary alkyl chain is that carbon chain of the molecule having the greatest length of carbon atoms and directly appending carboxyl functional groups. Octanoic acid can reduce surface tension to assist in wetting of hydrophobic surfaces like skin.

Peroxycarboxylic (or percarboxylic) acids generally have the formula $R(CO_3H)_n$, where R is an alkyl, arylalkyl, cycloalkyl, aromatic or heterocyclic group, and n is one, two, or three, and named by prefixing the parent acid with peroxy. While peroxycarboxylic acids are not as stable as carboxylic acids, their stability generally increases with increasing molecular weight. Thermal decomposition of these acids can generally proceed by free radical and non-radical paths, by photodecomposition or radical-induced decomposition, or by the action of metal ions or complexes. Percarboxylic acids can be made by the direct, acid catalyzed equilibrium action of hydrogen peroxide with the carboxylic acid, by autoxidation of aldehydes, or from acid chlorides, and hydrides, or carboxylic anhydrides with hydrogen or sodium peroxide.

Peroxycarboxylic acids useful in the compositions and methods of the present invention include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic and peroxysubric acid and mixtures thereof. Peroxy forms of carboxylic acids with more than one carboxylate moiety can have one or more of the carboxyl moieties present as peroxycarboxyl moieties. These peroxycarboxylic acids have been found to provide good antimicrobial action with good stability in aqueous mixtures. In a preferred embodiment, the composition of the invention utilizes a combination of several different peroxycarboxylic acids. Preferably, the composition includes one or more small $C_2$–$C_4$ peroxycarboxylic acids and one or more large $C_7$–$C_9$ peroxycarboxylic acids. Especially preferred is an embodiment in which the small peroxycarboxylic acid is peroxyacetic acid and the large acid is peroxyoctanoic acid.

Typically, the compositions and methods of the present invention include peroxyacetic acid. Peroxyacetic (or peracetic) acid is a peroxycarboxylic acid having the formula: $CH_3COOOH$. Generally, peroxyacetic acid is a liquid having an acrid odor at higher concentrations and is freely soluble in water, alcohol, ether, and sulfuric acid. Peroxyacetic acid can be prepared through any number of methods known to those of skill in the art including preparation from acetaldehyde and oxygen in the presence of cobalt acetate. A solution of peroxyacetic acid can be obtained by combining acetic acid with hydrogen peroxide. A 50% solution of peroxyacetic acid can be obtained by combining acetic anhydride, hydrogen peroxide and sulfuric acid. Other methods of formulation of peroxyacetic acid include those disclosed in U.S. Pat. No. 2,833,813, which is incorporated herein by reference.

Typically, the compositions and methods of the present invention include peroxyoctanoic acid, peroxynonanoic acid, or peroxyheptanoic acid, preferably peroxyoctanoic acid. Peroxyoctanoic (or peroctanoic) acid is a peroxycarboxylic acid having the formula, for example, of n-peroxyoctanoic acid: $CH_3(CH_2)_6COOOH$. Peroxyoctanoic acid can be an acid with a straight chain alkyl moiety, an acid with a branched alkyl moiety, or a mixture thereof Peroxyoctanoic acid can be prepared through any number of methods known to those of skill in the art. A solution of peroxyoctanoic acid can be obtained by combining octanoic acid and hydrogen peroxide.

A preferred antimicrobial composition of the present invention includes acetic acid, octanoic acid, peroxyacetic acid, and peroxyoctanoic acid. Such a composition can also include a chelating agent. A preferred composition preferably includes a combination of peroxyacetic acid and peroxyoctanoic acid effective for killing one or more of the food-borne pathogenic bacteria associated with a food product, such as *Salmonella typhimurium, Salmonella javiana, Campylobacter jejuni, Listeria monocytogenes,* and *Escherichia coli* O157:H7, yeast, mold and the like. The compositions and methods of the present invention have activity against a wide variety of microorganisms such as Gram positive (for example, *Listeria monocytogenes*) and Gram negative (for example, *Escherichia coli*) bacteria, yeast, molds, bacterial spores, viruses, etc. The compositions and methods of the present invention, as described above, have activity against a wide variety of human pathogens. The compositions and methods can kill a wide variety of microbes on the surface of a food product or in water used for washing or processing of food product.

The preferred compositions include concentrate compositions and use compositions. Typically, an antimicrobial concentrate composition can be diluted, for example with water, to form an antimicrobial use composition. In a preferred embodiment, the concentrate composition is diluted into water employed for washing or processing food product.

The advantageous stability of mixed peroxycarboxylic acid compositions in such methods, which include the presence of food product debris or residue, makes these compositions competitive with cheaper, less stable, and potentially toxic chlorinated compounds. Preferred methods of the present invention include agitation or sonication of the use composition, particularly as a concentrate is added to water to make the use composition. Preferred methods include water systems that have some agitation, spraying, or other mixing of the solution.

Ester Peroxycarboxylic Acid Antimicrobial Agents

As used herein, ester peroxycarboxylic acid refers to a molecule having the formula:

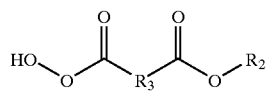

In this formula, $R_2$ and $R_3$ can independently be any of a wide variety of organic groups (e.g., alkyl, linear or cyclic, aromatic or saturated) or substituted organic groups (e.g., with one or more heteroatoms or organic groups). Ester peroxycarboxylic acid can be made using methods typically employed for producing peroxycarboxylic acid, such as incubating the corresponding monoester or diester dicarboxylate with hydrogen peroxide. Ester peroxycarboxylic acids derived from or corresponding to the diester dicarboxylates described herein are preferred.

Preferred ester peroxycarboxylic acids include alkyl ester peroxycarboxylic acids, preferably having the formula:

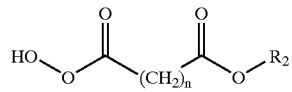

where $R_2$ represents an alkyl group having from 1 to 8 carbons and n is 0 to 8, preferably 2 to 6. The alkyl group can be either straight chain or branched. Preferably, $R_2$ is a methyl, ethyl, propyl (n-, iso-), butyl (n-, iso-, tert-), n-amyl, n-hexyl, or 2-ethylhexyl group. Preferably, n is 2, 3, 4, 5, or 6. In one preferred embodiment, the composition of the present invention includes a mixture of alkyl ester peroxycarboxylic acids in which n is 2, 3, and 4. Such a mixture includes monoesters of peroxyadipic, peroxyglutaric, and peroxysuccinic acids. In another preferred embodiment, a majority of the ester peroxycarboxylic acid in the composition has n equal to 3. In a preferred embodiment, $R_2$ is a $C_1$–$C_8$ alkyl. In a preferred embodiment, n is 1, 2, 3, or 4. Most preferably, $R_2$ is a $C_1$ alkyl, $C_2$ alkyl, $C_3$ alkyl, or $C_4$ alkyl, and n is 2, 3 or 4, or a combination thereof. In another most preferred embodiment, R2 is a $C_5$–$C_8$alkyl, n is 5 or 6.

Alkyl ester peroxycarboxylic acids useful in this invention include all monoesters of monoperoxyoxalic acid, monoperoxymalonic acid, monoperoxysuccinic acid, monoperoxyglutaric acid, monoperoxyadipic acid, monoperoxypimelic acid, monoperoxysuberic acid, and monoperoxysebacic acid (or mixtures thereof) with methanol, ethanol, propanol (e.g., n-propanol or isopropanol), butanol (e.g., n-butanol, iso-butanol, or tert-butanol), amyl alcohol (e.g., n-pentanol, iso-pentanol, sec-pentanol, or tert-pentanol), hexanol (e.g., n-hexanol, iso-hexanol, sec-hexanol, or tert-hexanol), octanol (e.g., n-octanol, iso-octanol, sec-octanol, or tert-octanol) or mixtures thereof.

Such alkyl ester peroxycarboxylic acids include monomethyl monoperoxyoxalic acid, monomethyl monoperoxymalonic acid, monomethyl monoperoxysuccinic acid, monomethyl monoperoxyglutaric acid, monomethyl monoperoxyadipic acid, monomethyl monoperoxypimelic acid, monomethyl monoperoxysuberic acid, monomethyl peroxysuberic acid, monomethyl monoperoxysebacic acid; monoethyl monoperoxyoxalic acid, monoethyl monoperoxymalonic acid, monoethyl monoperoxysuccinic acid, monoethyl monoperoxyglutaric acid, monoethyl monoperoxyadipic acid, monoethyl monoperoxypimelic acid, monoethyl monoperoxysuberic acid, monoethyl monoperoxysebacic acid; monopropyl monoperoxyoxalic acid, monopropyl monoperoxymalonic acid, monopropyl monoperoxysuccinic acid, monopropyl monoperoxyglutaric acid, monopropyl monoperoxyadipic acid, monopropyl monoperoxypimelic acid, monopropyl monoperoxysuberic acid, monopropyl monoperoxysebacic acid, in which propyl can be n- or iso-propyl; monobutyl monoperoxyoxalic acid, monobutyl monoperoxymalonic acid, monobutyl monoperoxysuccinic acid, monobutyl monoperoxyglutaric acid, monobutyl monoperoxyadipic acid, monobutyl monoperoxypimelic acid, monobutyl monoperoxysuberic acid, monobutyl monoperoxysebacic acid, in which butyl can be n-, iso-, or t-butyl; monoamyl monoperoxyoxalic acid, monoamyl monoperoxymalonic acid, monoamyl monoperoxysuccinic acid, monoamyl monoperoxyglutaric acid, monoamyl monoperoxyadipic acid, monoamyl monoperoxypimelic acid, monoamyl monoperoxysuberic acid, monoamyl monoperoxysebacic acid, in which amyl is n-pentyl, iso-pentyl, sec-pentyl, or tert-pentyl; monohexyl monoperoxysebacic acid, in which hexyl is n-hexyl, isohexyl, sec-hexyl, or tert-hexyl; mono-2-ethylhexyl monoperoxysebacic acid.

Preferred alkyl ester peroxycarboxylic acids include monomethyl peroxyoxalic acid, monomethyl peroxymalonic acid, monomethyl peroxysuccinic acid, monomethyl peroxyglutaric acid, monomethyl peroxyadipic acid, monomethyl peroxypimelic acid, and monomethyl peroxysuberic acid.

Liquid Peroxycarboxylic Acid Antimicrobial Compositions

A variety of liquid peroxycarboxylic acid antimicrobial compositions are known to those of skill in the art and can be employed in the methods of the present invention. For example, suitable compositions are disclosed in U.S. Pat. No. 6,010,729, issued Jan. 4, 2000 to Gutzmann et al.; U.S. Pat. No. 5,718,910, issued Feb. 17, 1998 to Oakes et al.; U.S. Pat. No. 5,674,538, issued May 24, 1994 to Lokkesmoe et al.; U.S. Pat. No. 5,489,434, issued Feb. 6, 1996 to Oakes et al.; U.S. Pat. No. 5,437,868, issued Aug. 1, 1995 to Oakes et al.; U.S. Pat. No. 5,409,713, issued Apr. 25, 1995 to Lokkesmoe et al.; U.S. Pat. No. 5,314,687, issued May 24, 1994 to Oakes et al.; and U.S. Pat. No. 5,200,189, issued Apr. 6, 1993 to Oakes et al.; which are incorporated herein by reference for disclosure of these compositions and methods for applying them.

A mixture of peroxyacetic acid with peroxyoctanoic acid can be employed in methods and systems of the present invention. This mixture is advantageously suited for reducing the microbial burden in or on poultry or poultry process waters. This composition is described in U.S. patent application Ser. No. 09/738,806 entitled METHOD AND COMPOSITION FOR WASHING POULTRY DURING PROCESSING, which was filed Dec. 15, 2000. This patent application is incorporated herein by reference for disclosure of these compositions.

A preferred antimicrobial concentrate composition of the present invention includes about 40 to about 70 weight-%, preferably about 45 to about 65 weight-%, preferably about 50 to about 60 weight-% acetic acid; about 2 to about 20 weight-%, preferably about 2 to about 8 weight-% octanoic acid; and about 5 to about 15 weight-% hydrogen peroxide. This composition can advantageously also include about 0.3 to about 1 weight-% chelating agent. Preferably, such an antimicrobial concentrate composition includes about 55 weight-% acetic acid, about 11 weight-% hydrogen peroxide, and about 4 weight-% octanoic acid. This composition can advantageously also include about 0.6 weight-% chelating agent. This concentrate composition can be prepared according to the proportions described above. After combining the ingredients in these proportions, certain ingredients, such as the acetic acid, octanoic acid, and hydrogen peroxide, react to form peroxyacetic acid and peroxyoctanoic acid.

By about two weeks after combining, the reaction of these ingredients has approached equilibrium. That is, the relative amounts of one or more of peroxyacetic acid, acetic acid, peroxyoctanoic acid, octanoic acid, and hydrogen peroxide will be roughly constant. The equilibrium amount will be affected by decomposition or other reaction, if any, of any labile species. A preferred antimicrobial concentrate composition of the present invention includes an equilibrium mixture resulting from a combination of about 40 to about 70 weight-%, preferably about 45 to about 65 weight-%, preferably about 50 to about 60 weight-% acetic acid; about 2 to about 20 weight-%, preferably about 2 to about 8 weight-% octanoic acid; and about 5 to about 15 weight-% hydrogen peroxide. This equilibrium composition can advantageously also include about 0.3 to about 1 weight-% chelating agent. A more preferred antimicrobial concentrate composition of the present invention includes an equilibrium mixture resulting from a combination of about 55 weight-% acetic acid, about 11 weight-% hydrogen peroxide, and about 4 weight-% octanoic acid. This equilibrium composition can advantageously also include about 0.6 weight-% chelating agent.

A preferred antimicrobial concentrate composition of the present invention includes about 30 to about 60 weight-%, preferably about 35 to about 60 weight-%, preferably about 35 to about 50 weight-%, preferably about 40 to about 50 weight-% acetic acid; about 1 to about 15 weight-%, preferably about 1 to about 7 weight-% octanoic acid; about 2 to about 12 weight-%, preferably about 2 to about 8 weight-% hydrogen peroxide; about 6 to about 16 weight-%, preferably about 8 to about 16 weight-% peroxyacetic acid; and about 0.1 to about 5 weight-%, preferably about 0.1 to about 2 weight-% peroxyoctanoic acid. This concentrate composition can advantageously also include about 0.1 to about 2 weight-% chelating agent. Preferably, such an antimicrobial concentrate composition includes about 40 weight-% acetic acid, about 3 weight-% octanoic acid, about 6 weight-% hydrogen peroxide, about 10 weight-% peroxyacetic acid, and about 0.8 weight-% peroxyoctanoic acid. This antimicrobial concentrate composition can advantageously include about 0.6 weight-% chelating agent. Preferably, such an antimicrobial concentrate composition includes about 41 weight-% acetic acid, about 3.2 weight-% octanoic acid, about 6.2 weight-% hydrogen peroxide, about 12 weight-% peroxyacetic acid, and about 0.80 weight-% peroxyoctanoic acid. This antimicrobial concentrate composition can advantageously include about 0.60 weight-% chelating agent. These preferred compositions can be produced by mixing the acid and peroxide components at proportions listed in preceding paragraphs and allowing the composition to sit at ambient temperature for a period of about one to about two weeks. That is, these preferred compositions can be considered equilibrium compositions.

The compositions of the present invention also include antimicrobial use compositions. Preferred antimicrobial use compositions include about 5 to about 1000 ppm acetic acid; about 0.5 to about 100 ppm, preferably about 0.5 to about 75 ppm octanoic acid; about 1 to about 200 ppm, preferably about 1 to about 110 ppm hydrogen peroxide; about 2 to about 300 ppm, preferably about 2 to about 220 ppm peroxyacetic acid, and about 0.1 to about 20 ppm peroxyoctanoic acid. Such a use composition can advantageously include about 0.05 to about 30 ppm chelating agent. Preferably, such an antimicrobial use composition includes about 7 (e.g., 6.8) ppm acetic acid, about 0.5 ppm octanoic acid, about 1 ppm hydrogen peroxide, about 2 ppm peroxyacetic acid, and about 0.1 ppm peroxyoctanoic acid. This use composition can advantageously include about 0.1 ppm chelating agent. Preferably, such an antimicrobial use composition includes about 20 (e.g. 17) ppm acetic acid, about 1 to about 2 (e.g., 1.3) ppm octanoic acid, about 2 to about 3 (e.g., 2.6) ppm hydrogen peroxide, about 5 ppm peroxyacetic acid, and about 0.3 ppm peroxyoctanoic acid. This use composition can advantageously include about 0.3 ppm chelating agent. Preferably, such an antimicrobial use composition includes about 100 (e.g., 101) ppm acetic acid, about 8 ppm octanoic acid, about 10 to about 20 (e.g., 16) ppm hydrogen peroxide, about 30 ppm peroxyacetic acid, and about 2 ppm peroxyoctanoic acid. This use composition can advantageously include about 1 to about 2 (e.g. 1.5) ppm chelating agent. Preferably, such an antimicrobial use composition includes about 1000 (e.g. 985) ppm acetic acid, about 70 to about 80 (e.g. 74) ppm octanoic acid, about 100 to about 200 (e.g. 110) ppm hydrogen peroxide, about 220 (e.g., 213) ppm peroxyacetic acid, and about 10 to about 20 (e.g. 14) ppm peroxyoctanoic acid. This use composition can advantageously include about 10 to about 20 (e.g., 13) ppm chelating agent. Different dilutions of a concentrate composition can result in different levels of the components of the use composition, generally maintaining the relative proportions. For example, a use composition of the present invention can have concentrations twice, one half, or one quarter those listed above.

Another mixture of peroxyacetic acid with peroxyoctanoic acid can be employed in the methods and systems of the present invention. This mixture is advantageously suited for preventing microbial growth in aqueous streams, especially those streams employed for transporting or processing a food or plant product. This composition is described in U.S. patent application Ser. No. 09/614,631 filed Jul. 12, 2000 and entitled METHOD AND COMPOSITION FOR INHIBITION OF MICROBIAL GROWTH IN AQUEOUS FOOD TRANSPORT AND PROCESS STREAMS. This patent application is incorporated herein by reference for disclosure of these compositions.

A preferred antimicrobial concentrate composition of the present invention includes about 50 to about 60 weight-% acetic acid, about 10 to about 20 weight-% octanoic acid, about 5 to about 15 weight-% hydrogen peroxide, and about 0.3 to about 1 weight-% chelating agent. Preferably, such an antimicrobial concentrate composition includes about 54 weight-% acetic acid, about 10 weight-% hydrogen peroxide, about 0.6 weight-% chelating agent, and about 14 weight-% octanoic acid. This concentrate composition can be prepared according to the proportions described above. After combining the ingredients in these proportions, certain ingredients, such as the acetic acid, octanoic acid, and hydrogen peroxide, react to form peroxyacetic acid and peroxyoctanoic acid.

By about two weeks after combining, the reaction of these ingredients has approached equilibrium. That is, the relative amounts of one or more of peroxyacetic acid, acetic acid, peroxyoctanoic acid, octanoic acid, and hydrogen peroxide will be roughly constant. The equilibrium amount will be affected by decomposition or other reaction, if any, of any labile species. A preferred antimicrobial concentrate composition of the present invention includes an equilibrium mixture resulting from a combination of about 50 to about 60 weight-% acetic acid, about 10 to about 20 weight-% octanoic acid, about 5 to about 15 weight-% hydrogen peroxide, and about 0.3 to about 1 weight-% chelating agent. A more preferred antimicrobial concentrate composition of the present invention includes an equilibrium mixture resulting from a combination of about 54 weight-% acetic acid, about 14 weight-% octanoic acid, about 10 weight-% hydrogen peroxide, and about 0.6 weight-% chelating agent.

A preferred antimicrobial concentrate composition of the present invention includes about 35 to about 45 weight-% acetic acid, about 5 to about 15 weight-% octanoic acid, about 3 to about 8 weight-% hydrogen peroxide, about 8 to about 16 weight-% peroxyacetic acid, about 1 to about 5 weight-% peroxyoctanoic acid, and about 0.1 to about 2 weight-% chelating agent. Preferably, such an antimicrobial concentrate composition includes about 40 weight-% acetic acid, about 10 weight-% octanoic acid, about 5 weight-% hydrogen peroxide, about 12 weight-% peroxyacetic acid, about 3 weight-% peroxyoctanoic acid, and about 0.6 weight-% chelating agent. These preferred compositions can be produced by mixing the acid and peroxide components at proportions listed in preceding paragraphs and allowing the composition to sit at ambient temperature for a period of approximately two weeks. That is, these preferred compositions can be considered equilibrium compositions.

The compositions of the present invention also include antimicrobial use compositions. Preferred antimicrobial use compositions include about 10 to about 150 ppm acetic acid, about 5 to about 40 ppm octanoic acid, about 4 to about 20 ppm hydrogen peroxide, about 5 to about 50 ppm peroxyacetic acid, about 2 to about 25 ppm peroxyoctanoic acid, and about 0.2 to about 2.5 ppm chelating agent. Preferably, such an antimicrobial use composition about 133 ppm acetic acid, about 33 ppm octanoic acid, about 17 ppm hydrogen peroxide, about 40 ppm peroxyacetic acid, about 33 ppm peroxyoctanoic acid, and about 2 ppm chelating agent. Different dilutions of a concentrate composition can result in different levels of the components of the use composition, generally maintaining the relative proportions. For example, a use composition of the present invention can have concentrations twice, one half, or one quarter those listed above.

More About Liquid Peroxycarboxylic Acid Compositions

The level of reactive species, such as peroxy acids and/or hydrogen peroxide, in a use composition can be affected, typically diminished, by organic matter that is found in or added to the use composition. For example, when the use composition is a bath or spray used for washing food product, food product organic matter or accompanying organic matter will consume peroxy acid and peroxide. Thus, the amounts of ingredients listed for the use compositions refer to the composition before or early in use, with the understanding that the amounts will diminish as organic matter is added to the use composition.

In addition, the concentrate and use compositions change with age. It is believed that in approximately one year at ambient conditions the amount of peroxycarboxylic acid in the compositions can decrease to about 70% to about 80%, preferably about 80% to about 85%, of the initial equilibrium values or use composition levels. Such aged compositions are included in the scope of the present invention.

In each of the compositions described above, the chelating agent is an optional, but preferred, ingredient. Typically the balance of each of the compositions described above is made up primarily or exclusively of a solvent, such as water, e.g. tap or other potable water.

The compositions of the present invention preferably include only ingredients that can be employed in food products or in food product washing, handling, or processing, for example, according to government (e.g. FDA or USDA) rules and regulations. Preferably, the composition is free of any peroxycarboxylic acid or carboxylic acid with 10, 12, or more carbon atoms. Such 10, 12, or more carbon acids can impart undesirable residues (e.g. bad tasting and/or malodorous) to food product.

Each of the compositions listed above can be formulated by combining each of the listed ingredients. In addition, certain compositions including both acid and peroxy acid can be formulated by combining the acids and hydrogen peroxide, which forms peroxy acids. Typically, the pH of an equilibrium mixture is less than about 1 or about 2, and the pH of a 1% solution of the equilibrium mixture in water is about 2 to about 7, depending on the other components of the 1% solution, and the pH of a use composition can be from about 4 to about 7 depending on the other components.

Other Fluid Compositions

The present methods can employ antimicrobial compositions including a critical, near critical, or supercritical (densified) fluid and an antimicrobial agent or a gaseous composition of an antimicrobial agent. The densified fluid can be a near critical, critical, supercritical fluid, or another type of fluid with properties of a supercritical fluid. Fluids suitable for densification include carbon dioxide, nitrous oxide, ammonia, xenon, krypton, methane, ethane, ethylene, propane, certain fluoroalkanes (e.g., chlorotrifluoromethane and monofluoromethane), and the like, or mixtures thereof. Preferred fluids include carbon dioxide. The antimicrobial composition can also include other ingredients, such as another fluid or gas; a carrier, solvent or cosolvent; an oxidizing agent; a fatty acid; or a mixture thereof.

The antimicrobial agent applied with a densified fluid system can be any of a variety of food surface compatible antimicrobial agents, such as one or more peroxycarboxylic acids, quaternary ammonium antimicrobial agents, acid sanitizers, mixtures thereof, and other food surface compatible antimicrobial agents. A preferred densified fluid antimicrobial composition that can be employed in the present methods includes densified carbon dioxide, peroxyacetic acid, hydrogen peroxide, acetic acid, peroxyoctanoic acid, and octanoic acid, which can be referred to as a densified fluid mixed peroxycarboxylic acid composition.

In another embodiment, the antimicrobial composition includes the fluid, an antimicrobial agent, and any of the optional or added ingredients, but is in the form of a gas.

Densified fluid antimicrobial compositions can be applied by any of several methods known to those of skill in the art. Such methods include venting at the food product a vessel containing densified fluid and antimicrobial agent. The aqueous phase, which includes hydrogen peroxide, is advantageously retained in the device. The vented gas includes an effective amount of antimicrobial agent making the densified fluid peroxycarboxylic acid compositions effective antimicrobial agents.

Because of the high pressure nature of the densified fluid compositions of the invention, these compositions are typically applied by venting a vessel containing the composition through a pressure relief device that is designed to promote rapid efficient coverage of the food product. Devices including such a pressure relief device include sprayers, foggers, foamers, foam pad applicators, brush applicators or any other device that can permit the expansion of the fluid materials from high pressure to ambient pressure while applying the material to the food product.

The densified fluid peroxycarboxylic acid composition can also be applied to food product by any of a variety of methods known for applying gaseous agents to food product during processing, including air chilling and packaging (e.g. modified atmosphere packaging), particularly at steps where adding water to the food product is disadvantageous.

Densified fluid antimicrobial compositions can be made by reacting an oxidizable substrate with an oxidizing agent in a medium comprising a densified fluid to form an antimicrobial composition. This reaction is typically carried out in a vessel suitable for containing a densified fluid. Reacting can include adding to the vessel the oxidizable substrate and the oxidizing agent, and adding fluid to the vessel to form the densified fluid. A preferred reaction system involves a reaction between a carboxylic acid and hydrogen peroxide to form the corresponding peroxycarboxylic acid. The hydrogen peroxide is commonly supplied in the form of an aqueous solution of hydrogen peroxide. Preferred carboxylic acids include acetic acid, heptanoic acid, octanoic acid, nonanoic acid, and mixtures thereof.

Supercritical, subcritical, near supercritical, and other dense fluids and solvents that can be employed with such fluids are disclosed in U.S. Pat. No. 5,306,350, issued Apr. 26, 1994 to Hoy et al., which is incorporated herein for such disclosure. Supercritical and other dense forms of carbon dioxide, and cosolvents, co-surfactants, and other additives that can be employed with these forms of carbon dioxide are disclosed in U.S. Pat. No. 5,866,005, issued Feb. 2, 1999 to DeSimone et al., which is incorporated herein for such disclosure.

Hydrogen Peroxide

The antimicrobial compositions of the invention typically also include a hydrogen peroxide constituent. Hydrogen peroxide in combination with the percarboxylic acid provides certain antimicrobial action against microorganisms. Additionally, hydrogen peroxide can provide an effervescent action which can irrigate any surface to which it is applied. Hydrogen peroxide works with a mechanical flushing action once applied which further cleans the surface. An additional advantage of hydrogen peroxide is the food compatibility of this composition upon use and decomposition. For example, combinations of peroxyacetic acid, peroxyoctanoic acid, and hydrogen peroxide result in acetic acid, octanoic acid, water, and oxygen upon decomposition, all of which are food product compatible.

Many oxidizing agents can be used for generating peroxycarboxylic acids. Suitable oxidizing agents, in addition to hydrogen peroxide, include perborate, percarbonate, and persulfate. Hydrogen peroxide is generally preferred for several reasons. After application of the $H_2O_2$/peroxycarboxylic acid germicidal agent, the residue left merely includes water and an acidic constituent. Deposition of these products on the surface of a food product processing apparatus, such as a bath or spray apparatus, will not adversely effect the apparatus, the handling or processing, or the food product washed therein.

Hydrogen peroxide ($H_2O_2$), has a molecular weight of 34.014 and it is a weakly acidic, clear, colorless liquid. The four atoms are covalently bonded in a H—O—O—H structure. Generally, hydrogen peroxide has a melting point of −0.41° C., a boiling point of 150.2° C., a density at 25° C. of 1.4425 grams per cm$^3$, and a viscosity of 1.245 centipoise at 20° C.

Carrier

The composition of or employed in the method of the invention also includes a carrier. The carrier provides a medium which dissolves, suspends, or carries the other components of the composition. For example, the carrier can provide a medium for solubilization and production of peroxycarboxylic acid and for forming an equilibrium mixture. The carrier also functions to deliver and wet the antimicrobial composition of the invention to the food product. To this end, the carrier may contain any component or components that can facilitate these functions.

Generally, the carrier includes primarily water which is an excellent solubilizer and medium for reaction and equilibrium. The carrier can include or be primarily an organic solvent, such as simple alkyl alcohols, e.g., ethanol, isopropanol, n-propanol, and the like. Polyols are also useful carriers, including propylene glycol, polyethyleneglycol, glycerol, sorbitol, and the like. Any of these compounds may be used singly or in combination with other organic or inorganic constituents or, in combination with water or in mixtures thereof.

Generally, the carrier makes up a large portion of the composition and may be the balance of the composition apart from the active antimicrobial components, adjuvants, and the like. Here again, the carrier concentration and type will depend upon the nature of the composition as a whole, the environmental storage, and method of application including concentration of the antimicrobial agent, among other factors. Notably the carrier should be chosen and used at a concentration which does not inhibit the antimicrobial efficacy of the active agent in the composition.

Adjuvants

The antimicrobial composition of or employed in the method of the invention can also include any number of adjuvants. Specifically, the composition can include stabilizing agents, wetting agents, hydrotropes, thickeners, a surfactant, foaming agents, acidifiers, as well as pigments or dyes among any number of constituents which can be added to the composition. Such adjuvants can be preformulated with the antimicrobial composition or added to the system simultaneously, or even after, the addition of the antimicrobial composition. The composition can also contain any number of other constituents as necessitated by the application, which are known to those of skill in the art and which can facilitate the activity of the present invention.

Stabilizing Agents

Stabilizing agents can be added to the composition, for example, to stabilize the peracid and hydrogen peroxide and prevent the premature oxidation of this constituent within the composition.

Chelating agents or sequestrants generally useful as stabilizing agents in the present compositions include alkyl diamine polyacetic acid-type chelating agents such as EDTA (ethylene diamine tetraacetate tetrasodium salt), acrylic and polyacrylic acid-type stabilizing agents, phosphonic acid, and phosphonate-type chelating agents among others. Preferable sequestrants include phosphonic acids and phosphonate salts including 1-hydroxy ethyldene-1,1-diphosphonic acid ($CH_3C(PO_3H_2)_2OH$) (HEDP), amino[tri(methylene phosphonic acid)]([$CH_2PO_3H_2$]$_2$(ethylene diamine[tetra methylene-phosphonic acid)], 2-phosphene butane-1,2,4-tricarboxylic acid, as well as the alkyl metal salts, ammonium salts, or alkyloyl amine salts, such as mono, di, or tetra-ethanolamine salts. The stabilizing agent is used in a concentration ranging from about 0 weight percent to about 20 weight percent of the composition, preferably from about 0.1 weight percent to about 10 weight percent of the composition, and most preferably from about 0.2 weight percent to 5 weight percent of the composition.

Amino phosphates and phosphonates are also suitable for use as chelating agents in the compositions and include ethylene diamine (tetramethylene phosphonates), nitrilotrismethylene phosphates, diethylenetriamine (pentamethylene phosphonates). These amino phosphonates commonly contain alkyl or alkaline groups with less than 8 carbon atoms. The phosphonic acid may also include a low molecular weight phosphonopolycarboxylic acid such as one having about 2–4 carboxylic acid moieties and about 1–3 phosphonic acid groups. Such acids include 1-phosphono1-methylsuccinic acid, phosphonosuccinic acid and 2-phosphonobutane-1,2,4-tricarboxylic acid.

Commercially available food additive chelating agents include phosphonates sold under the trade name DEQUEST® including, for example, 1-hydroxyethylidene-1,1-diphosphonic acid, available from Monsanto Industrial Chemicals Co., St. Louis, Mo., as DEQUEST® 2010; amino(tri(methylenephosphonic acid)), (N[$CH_2PO_3H_2$]$_3$), available from Monsanto as DEQUEST® 2000; ethylenediamine[tetra(methylenephosphonic acid)] available from Monsanto as DEQUEST® 2041; and 2-phosphonobutane-1,2,4-tricarboxylic acid available from Mobay Chemical Corporation, Inorganic Chemicals Division, Pittsburgh, Pa., as Bayhibit AM.

The above-mentioned phosphonic acids can also be used in the form of water soluble acid salts, particularly the alkali metal salts, such as sodium or potassium; the ammonium salts or the alkylol amine salts where the alkylol has 2 to 3 carbon atoms, such as mono-, di-, or triethanolamine salts. If desired, mixtures of the individual phosphonic acids or their acid salts can also be used.

The concentration of chelating agent useful in the present invention generally ranges from about 0.01 to about 10 wt-%, preferably from about 0.1 to about 5 wt-%, most preferably from about 0.5 to about 2 wt-%.

Wetting or Defoaming Agents

Also useful in the composition are wetting and defoaming agents. Wetting agents function to increase the surface contact or penetration activity of the antimicrobial composition. Wetting agents which can be used in the composition include any of those constituents known within the art to raise the surface activity of the composition.

Along these lines, surfactants, and especially nonionic surfactants, can also be useful in the present invention. Nonionic surfactants which can be useful in the present invention are those which include ethylene oxide moieties, propylene oxide moieties, as well a mixtures thereof, and ethylene oxide-propylene oxide moieties in either heteric or block formation. Additionally useful in the present invention are nonionic surfactants which include an alkyl ethylene oxide compounds, alkyl propylene oxide compounds, as well as mixtures thereof, and alkyl ethylene oxide-propylene oxide compounds where the ethylene oxide propylene oxide moiety is either in heteric or block formation. Further useful in the present invention are nonionic surfactants having any mixture or combination of ethylene oxide-propylene oxide moieties linked to a alkyl chain where the ethylene oxide and propylene oxide moieties can be in any randomized or ordered pattern and of any specific length. Nonionic surfactants useful in the present invention can also include randomized sections of block and heteric ethylene oxide propylene oxide, or ethylene oxide-propylene oxide, such as ethylene diamine ethylene oxides, ethylene diamine propylene oxides, mixtures thereof, and ethylene diamine EO-PO compounds, including those sold under the tradename Tetronic.

Generally, the concentration of nonionic surfactant used in a composition of the present invention can range from about 0 wt-% to about 5 wt-% of the composition, preferably from about 0 wt-% to about 2 wt-% of the concentrate composition, and most preferably from about 0 wt-% to about 1 wt-% of the composition.

The composition can also contain additional ingredients as necessary to assist in defoaming. Generally, defoamers which can be used in accordance with the invention include silica and silicones; aliphatic acids or esters; alcohols; sulfates or sulfonates; amines or amides; halogenated compounds such as fluorochlorohydrocarbons; vegetable oils, waxes, mineral oils as well as their sulfated derivatives; fatty acid soaps such as alkali, alkaline earth metal soaps; and phosphates and phosphate esters such as alkyl and alkaline diphosphates, and tributyl phosphates among others; and mixtures thereof.

Especially preferable, are those antifoaming agents or defoamers which are of food grade quality given the application of the method of the invention. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. Commercial defoamers commonly available include silicones such as Ardefoam® from Armour Industrial Chemical Company which is a silicone bound in an organic emulsion; Foam Kill® or Kresseo® available from Krusable Chemical Company which are silicone and non-silicone type defoamers as well as silicone esters; and Anti-Foam A® and DC-200 from Dow Corning Corporation which are both food grade type silicones among others. These defoamers can be present at a concentration range from about 0.01 wt-% to 5 wt-%, preferably from about 0.01 wt-% to 2 wt-%, and most preferably from about 0.01 wt-% to about 1 wt-%.

Hydrotrope

The food product wash composition of the invention or employed in the method of the invention can also include a hydrotrope coupler or solubilizer. Such materials can be used to ensure that the composition remains phase stable and in a single highly active aqueous form. Such hydrotrope solubilizers or couplers can be used at compositions which maintain phase stability but do not result in unwanted compositional interaction.

Representative classes of hydrotrope solubilizers or coupling agents include an anionic surfactant such as an alkyl sulfate, an alkyl or alkane sulfonate, a linear alkyl benzene or naphthalene sulfonate, a secondary alkane sulfonate, alkyl ether sulfate or sulfonate, an alkyl phosphate or phosphonate, dialkyl sulfosuccinic acid ester, sugar esters (e.g., sorbitan esters) and a $C_{8-10}$ alkyl glucoside.

Preferred coupling agents for use in the present compositions and methods include n-octane sulfonate and aromatic sulfonates such as an alkyl aryl sulfonate (e.g., sodium xylene sulfonate or naphthalene sulfonate). Many hydrotrope solubilizers independently exhibit some degree of antimicrobial activity at low pH. Such action adds to the efficacy of the invention but is not a primary criterion used in selecting an appropriate solubilizing agent. Since the presence of the peroxycarboxylic acid material in the protonated neutral state provides beneficial biocidal or antimicrobial activity, the coupling agent should be selected not for its independent antimicrobial activity but for its ability to provide effective single phase composition stability in the presence of substantially insoluble peroxycarboxylic acid materials and the more soluble compositions of the invention. Generally, any number of surfactants may be used consistent with the purpose of this constituent.

Anionic surfactants useful with the invention include alkyl carboxylates, linear alkylbenzene sulfonates, paraffin sulfonates and secondary n-alkane sulfonates, sulfosuccinate esters and sulfated linear alcohols.

Zwitterionic or amphoteric surfactants useful with the invention include β-N-alkylaminopropionic acids, n-alkyl-β-iminodipropionic acids, imidazoline carboxylates, n-alkyiletaines, amine oxides, sulfobetaines and sultaines.

Nonionic surfactants useful in the context of this invention are generally polyether (also known as polyalkylene oxide, polyoxyalkylene or polyalkylene glycol) compounds. More particularly, the polyether compounds are generally polyoxypropylene or polyoxyethylene glycol compounds. Typically, the surfactants useful in the context of this invention are synthetic organic polyoxypropylene (PO)-polyoxyethylene (EO) block copolymers. These surfactants have a diblock polymer including an EO block and a PO block, a center block of polyoxypropylene units (PO), and having blocks of polyoxyethylene grated onto the polyoxypropylene unit or a center block of EO with attached PO blocks. Further, this surfactant can have further blocks of either polyoxyethylene or polyoxypropylene in the molecule. The average molecular weight of useful surfactants ranges from about 1000 to about 40,000 and the weight percent content of ethylene oxide ranges from about 10–80% by weight.

Also useful in the context of this invention are surfactants including alcohol alkoxylates having EO, PO and BO blocks. Straight chain primary aliphatic alcohol alkoxylates can be particularly useful as sheeting agents. Such alkoxylates are also available from several sources including BASF Wyandotte where they are known as "Plurafac" surfactants. A particular group of alcohol alkoxylates found to be useful are those having the general formula R—(EO)$_m$—(PO)$_n$ wherein m is an integer of about 2–10 and n is an integer from about 2–20. R can be any suitable radical such as a straight chain alkyl group having from about 6–20 carbon atoms.

Other useful nonionic surfactants include capped aliphatic alcohol alkoxylates. These end caps include but are not limited to methyl, ethyl, propyl, butyl, benzyl and chlorine. Useful alcohol alkoxylated include ethylene diamine ethylene oxides, ethylene diamine propylene oxides, mixtures thereof, and ethylene diamine EO-PO compounds, including those sold under the tradename Tetronic. Preferably, such surfactants have a molecular weight of about 400 to 10,000. Capping improves the compatibility between the nonionic and the oxidizers hydrogen peroxide and peroxycarboxylic acid, when formulated into a single composition. Other useful nonionic surfactants are alkylpolyglycosides.

Another useful nonionic surfactant is a fatty acid alkoxylate wherein the surfactant includes a fatty acid moiety with an ester group including a block of EO, a block of PO or a mixed block or heteric group. The molecular weights of such surfactants range from about 400 to about 10,000, a preferred surfactant has an EO content of about 30 to 50 wt-% and wherein the fatty acid moiety contains from about 8 to about 18 carbon atoms.

Similarly, alkyl phenol alkoxylates have also been found useful in the invention. Such surfactants can be made from an alkyl phenol moiety having an alkyl group with 4 to about 18 carbon atoms, can contain an ethylene oxide block, a propylene oxide block or a mixed ethylene oxide, propylene oxide block or heteric polymer moiety. Preferably such surfactants have a molecular weight of about 400 to about 10,000 and have from about 5 to about 20 units of ethylene oxide, propylene oxide or mixtures thereof.

The concentration of hydrotrope useful in the present invention generally ranges from about 0.1 to about 20 wt-%, preferably from about 0.5 to about 10 wt-%, most preferably from about 1 to about 4 wt-%.

Thickening or Gelling Agents

Thickeners useful in the present invention include those which do not leave contaminating residue on the surface of food product or food product processing apparatus. That is, preferred thickeners or gelling agents do not include components incompatible with food or other sensitive products in contact areas.

Generally, thickeners which may be used in the present invention include natural gums such as xanthan gum, guar gum, or other gums from plant mucilage; polysaccharide based thickeners, such as alginates, starches, and cellulosic polymers (e.g., carboxymethyl cellulose); polyacrylates thickeners; and hydrocolloid thickeners, such as pectin. Generally, the concentration of thickener employed in the present compositions or methods will be dictated by the desired viscosity within the final composition. However, as a general guideline, the viscosity of thickener within the present composition ranges from about 0.1 wt-% to about 1.5 wt-%, preferably from about 0.1 wt-% to about 1.0 wt-%, and most preferably from about 0.1 wt-% to about 0.5 wt-%.

Formulation

The compositions of or used in the methods of the invention can be formulated by combining the antimicrobially active materials (e.g., carboxylic acids, peroxycarboxylic acids, and hydrogen peroxide) with adjuvant or other components with the materials that form the antimicrobial composition. The compositions can also be formulated with preformed peroxycarboxylic acids. The preferred compositions of the invention can be made by mixing the carboxylic acid or mixture thereof with an optional hydrotrope solubilizer or coupler, reacting the mixture with hydrogen peroxide and then adding the balance of required ingredients to provide rinsing and antimicrobial action.

A stable equilibrium mixture is produced containing the carboxylic acid or blend with hydrogen peroxide and allowing the mixture to stand for 1–14 days at 15° C. or more. With this preparatory method, an equilibrium mixture will be formed containing an amount of hydrogen peroxide, unoxidized acid, oxidized or peroxycarboxylic acid and unmodified couplers, solubilizer, or stabilizers.

Use Compositions

The invention contemplates a concentrate composition which is diluted to a use solution prior to application to food product. Primarily for reasons of economics, the concentrate would normally be marketed and an end user would preferably dilute the concentrate with water or an aqueous diluent to a use solution.

The level of active components in the concentrate composition is dependent on the intended dilution factor and the desired activity of the peroxycarboxylic acid compound and the carboxylic acid. Generally, a dilution of about 0.5 to about 20 fluid ounces to about 100 gallons of water is used for aqueous antimicrobial compositions. Higher use dilutions can be employed if elevated use temperature (greater than 25° C.) or extended exposure time (greater than 30 seconds) can be employed. In the typical use locus, the concentrate is diluted with a major proportion of water and used for food product processing using commonly available tap or service water mixing the materials at a dilution ratio of about 3 to about 20 ounces of concentrate per 100 gallons of water.

Additional Antimicrobial Compositions

The present methods can employ antimicrobial compositions including any of a variety of antimicrobial agents. Such antimicrobial agents include quaternary ammonium antimicrobial agents, fatty acid sanitizers, and other food surface compatible antimicrobial agents.

Quaternary Ammonium Antimicrobial Agents

Quaternary ammonium antimicrobial agents are useful in the present invention, due to their commercial availability, easy incorporation into formulas and high sanitizing efficacy. These sanitizing agents are also preferred because of their compatibility to high water temperatures to the presence of high organic loads, stability and broad spectrum antimicrobial efficacy in variable high and low pH wash systems, inherent chemical deodorizing, and their non-staining, non-bleaching, non-corrosive nature.

Suitable agents which may be incorporated are quaternary ammonium salts of the formula:

in which at least one, but not more than two, of $R_1$, $R_2$, $R_3$, and $R_4$ is an organic radical containing a group selected from a $C_{16}$–$C_{22}$ aliphatic radical, or an alkyl phenyl or alkyl benzyl radical having 10–16 atoms in the alkyl chain, the remaining group or groups being selected from hydrocarbyl groups containing from 1 to about 4 carbon atoms, or $C_2$–$C_4$ hydroxy alkyl groups and cyclic structures in which the nitrogen atom forms part of the ring, and Y is an anion such as halide, methylsulphate, or ethylsulphate.

In the context of the above definition, the hydrophobic moiety (i.e. the $C_{16}$–$C_{22}$ aliphatic, $C_{10}$–$C_{16}$ alkyl phenyl or alkyl benzyl radical) in the organic radical may be directly attached to the quaternary nitrogen atom or may be indirectly attached thereto through an amide, esters, alkoxy, ether, or like grouping.

Illustrative quaternary ammonium salts include distearyl dimethyl ammonium chloride, stearyl dimethyl benzyl ammonium chloride, coconut alkyl dimethyl benzyl ammonium chloride, dicoconut alkyl dimethyl ammonium bromide, cetyl pyridinium iodide, and cetyl pyridinium iodide, and cetyl trimethyl ammonium bromide, and the like.

Fatty Acid Sanitizers

Suitable fatty acids for the antimicrobial composition include a food surface compatible aliphatic or aromatic fatty acid, either saturated or unsaturated, preferably, saturated, and having from about 6 to about 20 carbon atoms and, preferably, from about 8 to about 12 carbon atoms, as well as mixtures thereof. The fatty acid may be linear, branched or cyclic and may contain substituent atoms such as hydroxyl groups or ether linkages as long as the substituents do not affect antimicrobial activity. Preferably, the fatty acid employed is food surface compatible, linear, saturated and unsubstituted. Representative of the fatty acids contemplated for use herein include caproic acid, caprylic acid, capric acid, lauric acid, and octanoic acid as well as mixtures thereof.

Other Food Surface Compatible Antimicrobial Agents

Other food surface compatible antimicrobial agents include aldehyde antimicrobial agents, peracid and peroxygen antimicrobial agents, ozone, halogen containing antimicrobial agents, nitrogen containing antimicrobial agents and polymers (e.g., alkylamines), condensed phosphate antimicrobial agents (e.g., trisodium phosphate), and the like, and mixtures thereof. Halogen containing antimicrobial agents include organic halogen, inorganic halogen, neutral oxide of a halogen (e.g. chlorine dioxide), and halogen releasing antimicrobial agents, such as iodine, iodine complexes, interhalogens, and chlorine. Halogen containing antimicrobial agents include iodo-compounds or active halogen compounds (e.g., elemental halogens, halogen oxides, iodine, interhalides, polyhalides, hypochlorite salts, hypochlorous acid, hypobromite salts, hypobromous acid, chloro- and bromo-hydantoins, chlorine dioxide, and sodium chlorite). Preferred halogen containing compounds include elemental halogens, polyhalides, and halogen oxides (e.g., NaOCl, HOCl, HOBr, $ClO_2$), and the like. Preferred halogen oxides include hypochlorous acid (or its salts), chlorine dioxide, hypobromous acid (or its salts). Preferred halogen containing compounds also include an interhalide such as iodine monochloride, iodine dichloride, iodine trichloride, iodine tetrachloride, bromine chloride, iodine monobromide, or iodine dibromide. These various antimicrobial agents are known to those of skill in the art and can be employed in the compositions and methods of the present invention.

Other Ingredients

Chelating agents can be added with any of these additional antimicrobial agents to the composition to enhance biological activity and cleaning performance. For example, one-hydroxy ethylidene-1, one-di-phosphonic acid commercially available from the Monsanto Company under the trade designation "Dequest" has been found to assist in the disruption of cell structure of the polysaccharide-divalent metal ion complex thought to exist in gram negative microorganisms.

Alkyl phosphate esters possess some antimicrobial activity in their own right under the conditions of the present invention. This antimicrobial activity also tends to add to the overall antimicrobial activity of the present compositions even though the phosphate esters may be added for other reasons.

Other materials can be added to the invention to change its color or odor, to adjust its viscosity, to enhance its thermal (i.e., freeze-thaw) stability or to provide other qualities which tend to make it more marketable. For example, isopropanol, ethanol or generally-recognized-as-safe (GRAS) flavoring agents of the ethyl fatty acid esters, in small amounts (e.g., approximately 0.1 to 0.2%) can be added to the composition to reduce viscosity or to reduce fatty acid odor.

The present invention may be better understood with reference to the following example. This example is intended to be representative of specific embodiments of the invention, and is not intended as limiting the scope of the invention.

EXAMPLE

Antimicrobial Efficacy and Organoleptic Impact of X-Ray Irradiation on Ready to Eat Hot Dogs Inoculated With *Listeria Monocytogenes*

This demonstrates that reduction of pathogen levels in combination with irradiation allows for effective use of lower irradiation doses that protect food without causing detectable levels of undesirable sensory qualities.

Materials and Methods

Consumer style skinless hot dogs were shipped fresh to the lab immediately following production. All hot dogs were from the same production date and run and were of a pork, beef and poultry blend with a weight of 10 per lb. The hot dogs were shipped in bulk vacuum packages with 50 hot dogs per package. During transit, the packages were stored in coolers with ice to maintain refrigerated conditions at 35° F. Hot dog temperatures were monitored by electronic data loggers.

At the lab, the bulk packages were stored under refrigerated conditions at 37° F. until they were repackaged into vacuum-sealed five packs. Non-inoculated samples were vacuum sealed four days after production and shipped to RDI Long Island for irradiation at a control and five minimum irradiation dose levels (0, 1.0, 1.5, 2.0, 2.5, 3.0 kGy). Seven days after production, hot dogs designated for inoculation were surface treated with a control and three initial inoculation levels (0, $10^2$, $10^3$, $10^4$ cfu/g) and then vacuum packaged. The $10^3$ inoculation level was replicated so that $10^3$-A and $10^3$-B groups were tested to measure variability in the study. The inoculation was done on the surface of the hot dogs just prior to vacuum sealing using various dilutions of a five strain source culture of *Listeria monocytogenes* that was enumerated using a TSAYE direct plating method just prior to inoculation. The calculated aliquot amount was split into two applications for each hot dog. These inoculated hot dogs were transported to RDI Long Island for irradiation at a control and three minimum dose levels (0, 1, 2, 3, kGy).

All hot dogs, including controls that would not be irradiated, were shipped to IBA's RDI Long Island X-Ray Test Facility and back in coolers with ice. They were stored in RDI's walk in refrigerator before and after the irradiation runs to maintain refrigerated temperatures of 38–42° F. Appropriate packages were irradiated to predetermined dose levels with X-ray irradiation using a 3MeV DC Linear Electron Accelerator (Dynamatron) fitted with a tantalum target. All doses were delivered within ±0.1 kGy of the predetermined dose. All irradiation packaging configurations used were dose-mapped prior to the research runs using identical test product and radiochromic film dosimeters (Far West Technologies) arranged in an ACE grid pattern within the packaging configuration. This allowed for the establishment of relative dose ratios to an external reference dosimeter. External reference dosimeters where then included on the exterior of product coolers during the experimental runs with the test product and maximum/minimum doses were then calculated using the known reference dose ratios from the dose-mapping step.

After irradiation, microbial analysis was performed on the inoculated samples using USDA-MLG 1998 Most Probable Number (MPN) Method and AOAC 966.23 Aerobic Plate Count (APC) Method using TSAYE/MOX media and direct plating method with $10^{-1}$ through $10^{-6}$ dilutions. Non-inoculated controls were evaluated using both a Lactic Acid plate count (CMMEF, $3^{rd}$ ed.) and an APC method. For purposes of reporting results, the MPN number was used if the APC number was less than 31 cfu/g, otherwise the APC number was used. Data was converted to $\log_{10}$ then averaged over the five observations at each data point to report a single average $\log_{10}$ number at each data point.

Sensory testing was performed on non-inoculated samples by an expert panel. Samples were cooked according to directions supplied by the manufacturer. The trained panel, experienced in detailed appearance, flavor and texture analysis, was employed to evaluate the samples and develop aroma, flavor, texture and appearance criteria. A general Degree of Difference (DOD) ranking was then assigned to a test sample where applicable to summarize the level of difference in appearance, flavor or texture as compared to a non-irradiated control. The DOD scale is a 0 to 10 rating indicating how different a product is from a reference product or control with 0 meaning no difference and 10 being extremely different. The degree of difference rating quantifies the magnitude of the difference but is not directional.

Chemical analysis was also performed in order to quantify any lipid oxidation of the samples. Non-inoculated samples were tested for Peroxide Value (PV) and 2-Thiobarbituric Acid Values (TBA) using AOCS Cd 1b-87 and JAOCS 37(1): 41 respectively. The head space of the packages was also tested for $O_2$ or $CO_2$ content using gas chromatography and AOAC 986.12.

Results

Figure 2:
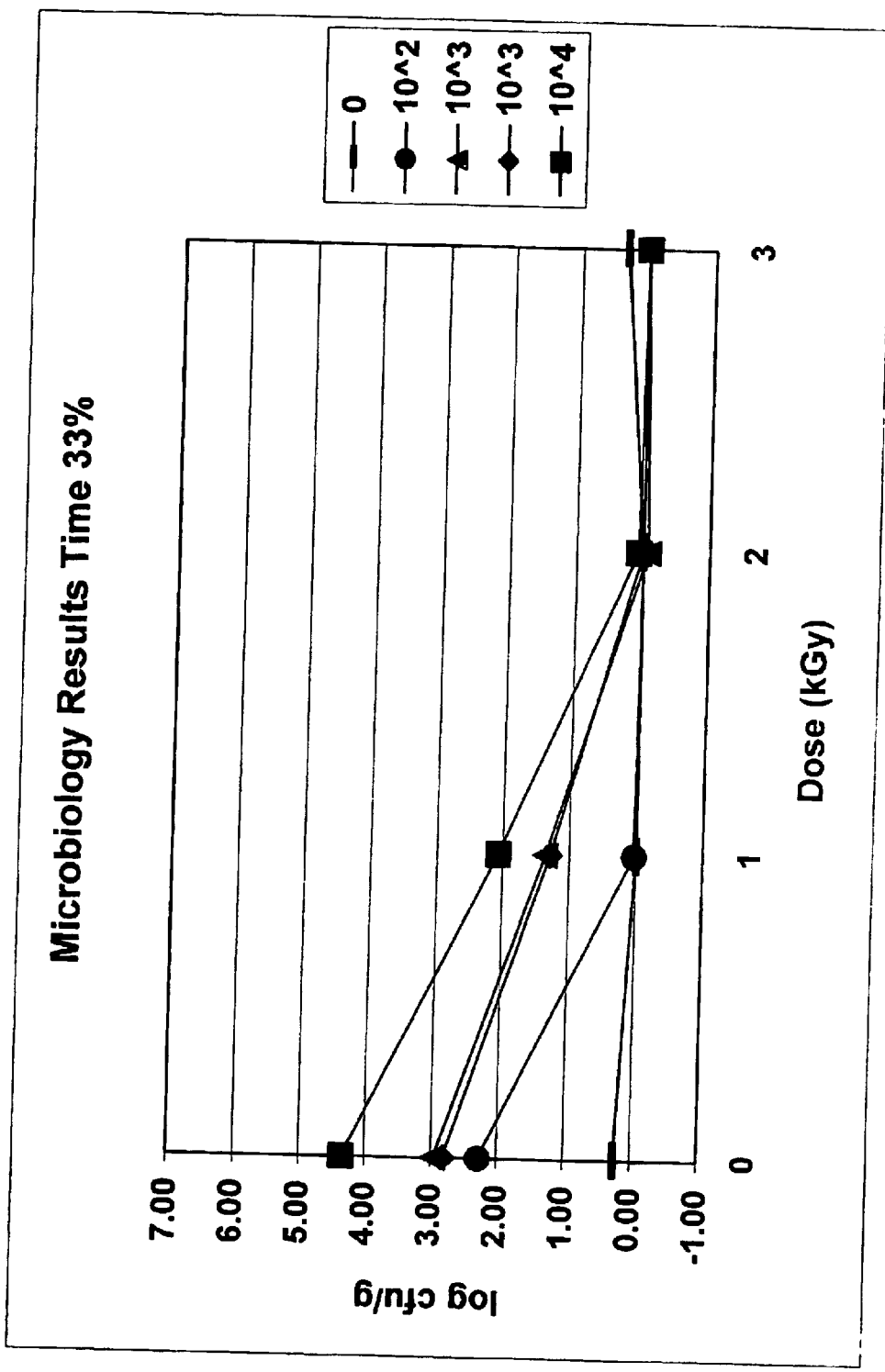
FIG. 2 illustrates the bacteria levels (Log cfu/g) measured after 33% of product shelf life at each amount of bacteria inoculated as a function of dose of irradiation.
Figure 3:
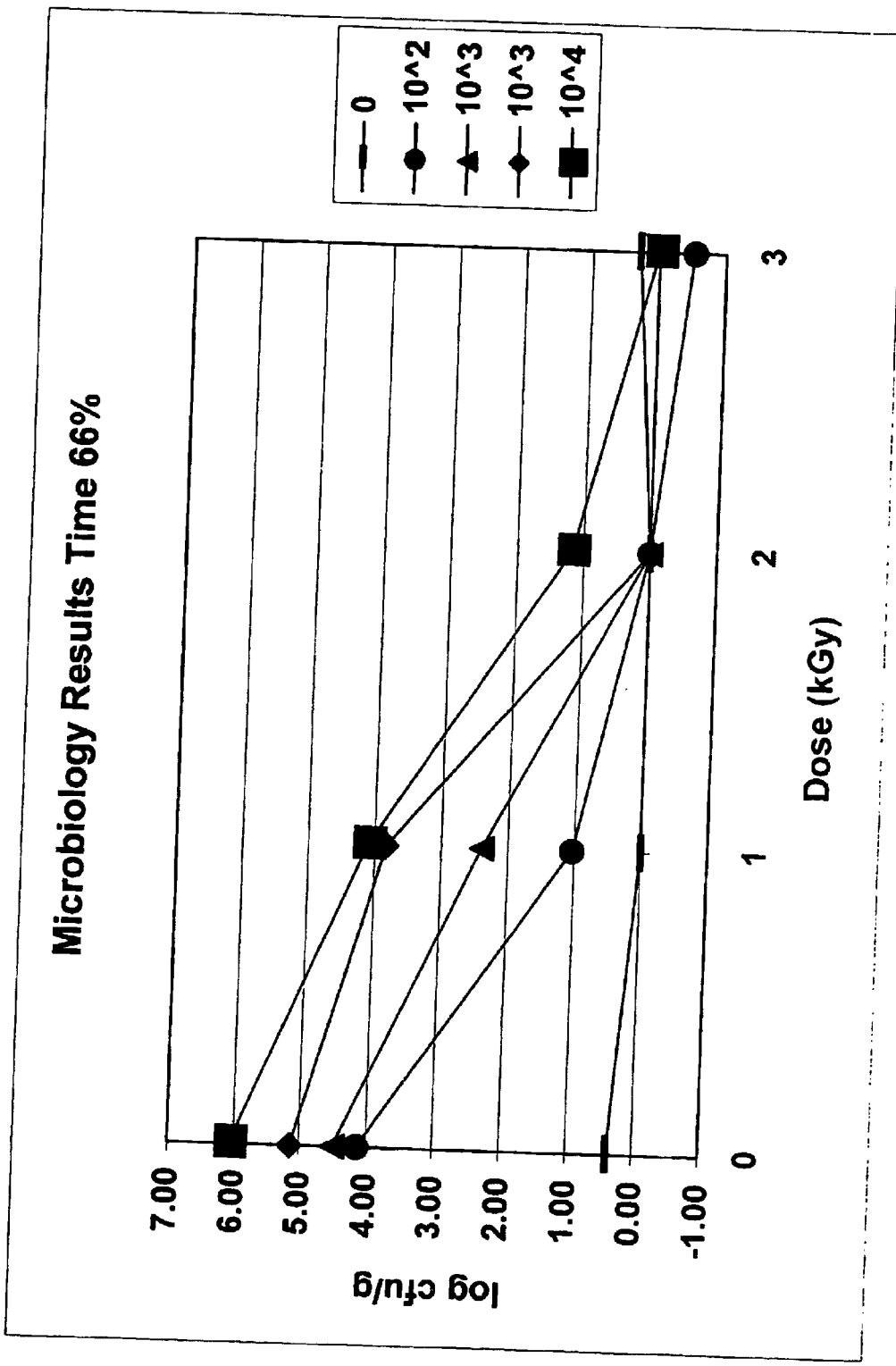
FIG. 3 illustrates the bacteria levels (Log cfu/g) measured after 66% of product shelf life at each amount of bacteria inoculated as a function of dose of irradiation.
Figure 4:
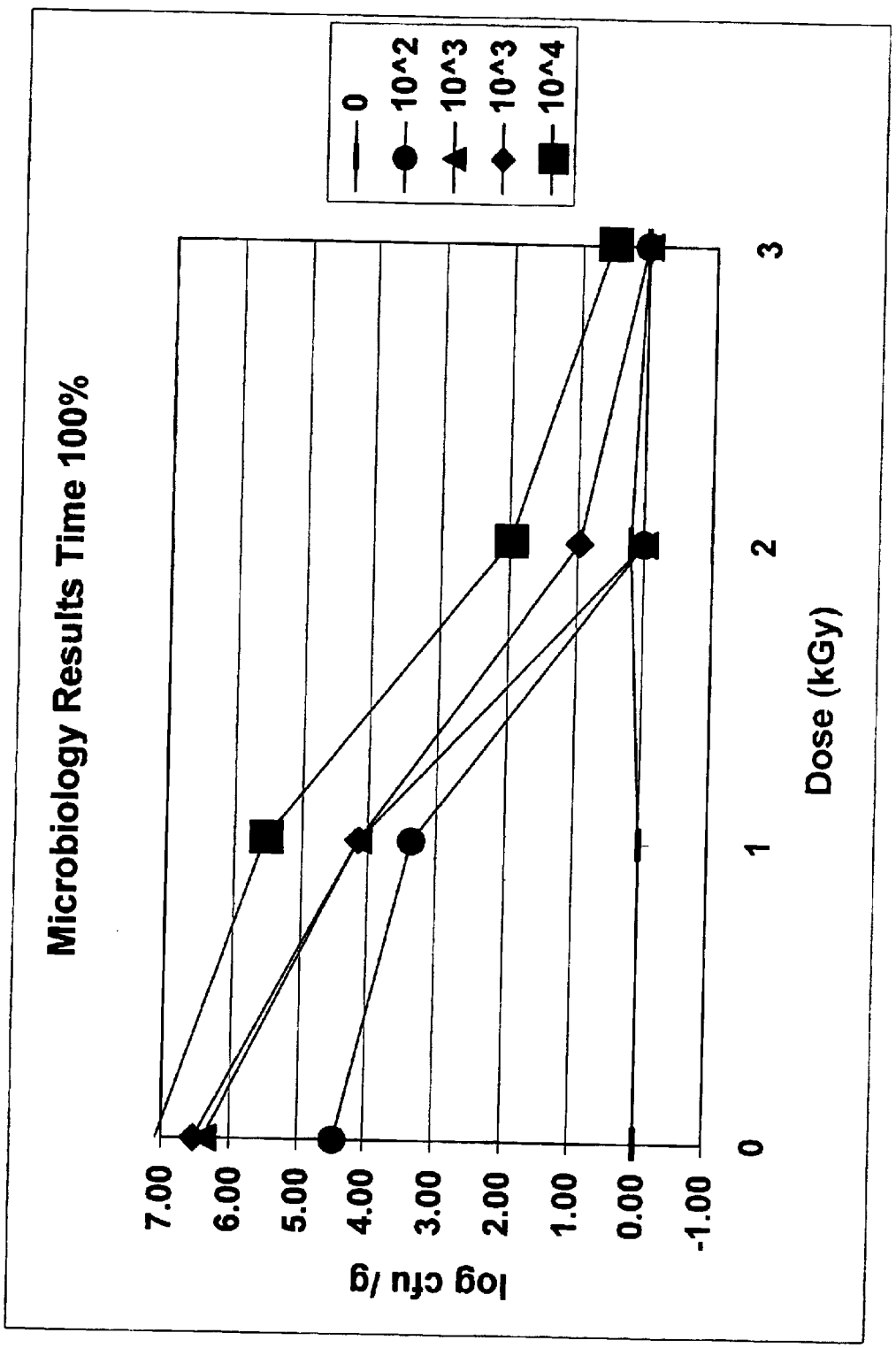
FIG. 4 illustrates the bacteria levels (Log cfu/g) measured after 100% of product shelf life at each amount of bacteria inoculated as a function of dose of irradiation.

The results obtained from the microbiological testing are reported in Tables 1–4 and FIGS. 1–4. Data points are result of average of 5 $\log_{10}$ counts at each inoculation/irradiation dose/time point. The 5 replicate samples were taken one each from the 5 hot dogs in each package at each data point. Microorganisms were measured by the method of the USDA-MPN/TSAYE-MOX(APC used for Inoculation level 0).

TABLE 1

Effect of irradiation on bacteria levels
(Log cfu/g) measured at the beginning of product
shelf life of as a function of amount of bacteria inoculated.

| Inoculation Level | Dose (kGy) | | | |
|---|---|---|---|---|
| | 0 | 1 | 2 | 3 |
| 0 | 0.66 | 0.00 | 0.26 | 0.00 |
| $10^2$ | 1.78 | 0.72 | 0.00 | 0.00 |

TABLE 1-continued

Effect of irradiation on bacteria levels
(Log cfu/g) measured at the beginning of product
shelf life of as a function of amount of bacteria inoculated.

| Inoculation Level | Dose (kGy) | | | |
|---|---|---|---|---|
| | 0 | 1 | 2 | 3 |
| $10^3$ | 2.73 | 1.22 | 0.00 | 0.00 |
| $10^3$ | 2.52 | 1.22 | 0.00 | 0.00 |
| $10^4$ | 3.37 | 2.66 | 0.84 | 0.00 |

TABLE 2

Effect of irradiation on bacteria levels (Log cfu/g) measured after 33%
of product shelf life of as a function of amount of bacteria inoculated.

| Inoculation Level | Dose (kGy) | | | |
|---|---|---|---|---|
| | 0 | 1 | 2 | 3 |
| 0 | 0.26 | 0.00 | 0.00 | 0.32 |
| $10^2$ | 2.28 | 0.04 | 0.00 | 0.00 |
| $10^3$ | 2.98 | 1.37 | −0.07 | 0.00 |
| $10^3$ | 2.80 | 1.30 | 0.00 | 0.00 |
| $10^4$ | 4.35 | 2.06 | 0.06 | 0.00 |

TABLE 3

Effect of irradiation on bacteria levels (Log cfu/g) measured after 67%
of product shelf life of as a function of amount of bacteria inoculated.

| Inoculation Level | Dose (kGy) | | | |
|---|---|---|---|---|
| | 0 | 1 | 2 | 3 |
| 0 | 0.40 | 0.00 | 0.00 | 0.30 |
| $10^2$ | 4.15 | 1.04 | 0.00 | −0.52 |
| $10^3$ | 4.51 | 2.38 | 0.00 | 0.00 |
| $10^3$ | 5.15 | 3.84 | 0.00 | 0.00 |
| $10^4$ | 6.07 | 4.11 | 1.19 | 0.00 |

TABLE 4

Effect of irradiation on bacteria levels (Log cfu/g) measured after 100%
of product shelf life of as a function of amount of bacteria inoculated.

| Inoculation Level | Dose (kGy) | | | |
|---|---|---|---|---|
| | 0 | 1 | 2 | 3 |
| 0 | 0.00 | 0.00 | 0.20 | 0.00 |
| $10^2$ | 4.46 | 3.38 | 0.00 | 0.00 |
| $10^3$ | 6.39 | 4.14 | 0.00 | 0.00 |
| $10^3$ | 6.52 | 4.16 | 0.95 | 0.00 |
| $10^4$ | 7.08 | 5.54 | 2.00 | 0.52 |

A very consistent anti-microbial affect was achieved relative to irradiation dose at each inoculation level. An average $D_{10}$ of 0.79 was calculated. This was based on an average of the negative inverses of the slopes of the $\log_{10}$ versus irradiation dose plots for *Listeria* reduction for inoculated samples at time zero. These values ranged from 0.66 to 0.94. The negative inverse is used to convert $\log_{10}$ *Listeria* population versus irradiation dose to irradiation dose in kGy versus $\log_{10}$ kill which is the "D" value for irradiation pasteurization (i.e. irradiation dose needed in kGy to achieve a level one $\log_{10}$ kill or one decimal reduction).

As can be seen in the FIGS. 1–4, the data confirms the hypothesis that lower bioburden levels allow for food to be treated with lower irradiation doses and maintain product quality over the coded shelf life. For example, a bioburden of $10^4$ requires an irradiation dose of 3.0 kGy to maintain a plate count of less than $10^2$ through the whole shelf life. However, a bioburden of $10^3$ was suppressed below a $10^2$ level throughout the shelf life using only 2.0 kGy. The lag phase of microbiological growth was also extended after initial kill.

An interesting corollary data point was recorded at time 125% of shelf life. Prior to sensory testing of non-inoculated products, a Total Plate Count was conducted to verify that the samples would be safe for the sensory panel. At the 125% time interval, the non-irradiated control sample had a count of $10^4$ while the sensory samples that were irradiated to 1 and 1.5 kGy were at $10^0$ levels. This means there is potential, from a microbiological standpoint, to extend the shelf life of the existing non-inoculated product with low level irradiation.

Sensory Evaluation

Texture. Texture differences between irradiated and control samples were not of a level that would be perceptible to consumers (5.0) until the coded shelf life had expired. The recorded texture differences associated with the 2.0 kGy and higher dose levels at 50% of shelf life ("more springy in first compression" and "more skin awareness") were below a level that consumers would detect and did not persist to the 100% time point, but did reappear at time 125%. The time 125% Texture DOD's were listed as "more roughness of mass," "skin awareness," "higher springiness," and "firmer skin." These were high enough to be detected for all but the lowest dose of 1.0 kGy. It appears that there are some initial texture changes which are then mitigated with time. The same or new factors then cause the texture qualities to deteriorate at the additional time 125% after the coded shelf life has been reached.

Appearance. No appearance attributes were recorded at a level high enough to be detected by consumers at any of the time or dose points. Although no DOD was recorded, it was noted at time 50% that the 2.5 and 3.0 kGy samples showed a "mottled" appearance which was recorded under "lack of evenness of color." However, this was not seen at the end of the shelf life.

Flavor. There were minor flavor DOD's versus non-irradiated controls for time 50% and 100% samples. However, these were at a level that would not be detected by consumers with the exception of the 3.0 kGy sample at time 100% which registered a 4.8 indicating some consumers would be able to detect a difference. At 125% of shelf life higher DOD values are associated with the higher dose level of 2–3 kGy and the DOD's exceed a level where consumers would likely be able to detect them. This data seems to indicate that a dose level related flavor difference appeared at time 100% and was more pronounced at time 125%. The flavor affects noted included higher "fat" off-flavor and a shift towards poultry flavor for the 3.0 kGy sample at time 100%. At time 125%, a shift to all poultry flavor is also identified along with "warmed over flavor," low "rancid pork fat," slight "cardboard," and "degraded protein" notes. While significant detectable organoleptic changes did not present themselves until later in the shelf life of the product, they did point toward a dose-level correlation which would support the hypothesis that lower irradiation levels would minimize or prevent detectable sensory effects.

Chemical Analysis

No indications of lipid oxidation were found in any of the chemical testing results. The PV value never rose above 1.18 meq/kg and the maximum TBA value was 0.35 mg/kg. Both of these results are far below levels where rancidity from lipid oxidation is usually detectable. No dose-related or shelf time dependent differences were seen for PV or TBA. This significantly corresponds to no detection of significant lipid oxidation from the sensory panel. For the $O_2$ and $CO_2$ values, there did not appear to be any difference from the control at any dose level and there was no diminishment of gaseous $O_2$ values over time as would be expected if oxidation occurred. Given the tight vacuum packaging of the product, concerns were expressed about the ability to collect a pure sample of the headspace gas with the sampling methodology. The results (21% oxygen, trace amounts of $CO_2$) would indicate that the sample was significantly tainted by atmospheric gasses.

Discussion

For hot dogs, an irradiation dose of less than 3.0 kGy avoided adverse sensory results up to the end of the shelf life (70 days). An irradiation dose of 2 kGy pasteurized hot dogs with an incoming bioburden of $10^2$ cfu/g or less. This demonstrates an effective food quality, cleaning, and sanitizing program that includes pre-irradiation reduction of the bioburden level to less than $10^2$ cfu/gm in the product.

Conclusions

This data establishes that reduction of pathogen levels in combination with irradiation effectively protected food with decreased irradiation and without causing detectable levels of undesirable sensory qualities.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "adapted and configured" describes a system, apparatus, or other structure that is constructed or configured to perform a particular task or adopt a particular configuration. The phrase "adapted and configured" can be used interchangeably with other similar phrases such as arranged and configured, constructed and arranged, adapted, constructed, manufactured and arranged, and the like.

All publications and patent applications in this specification are indicative of the level of ordinary skill in the art to which this invention pertains.

The invention has been described with reference to various specific and preferred embodiments and techniques. However, it should be understood that many variations and modifications may be made while remaining within the spirit and scope of the invention.

We claim:

1. A method of treating a food product to reduce microbial burden, comprising:

providing food product in the form of pork, fresh vegetables, fruit, fresh red meat, frozen red meat, fresh poultry, frozen poultry, eggs in their shell, or mixture thereof;

contacting the food product with an antimicrobial agent, the antimicrobial agent comprising peroxycarboxylic acid, fatty acid, halogen containing antimicrobial agent, quaternary ammonium antimicrobial agent, peroxide, condensed phosphate, or mixtures thereof; and (i) irradiating the food product with 0.05 kGy to about 0.5 kGy, wherein the food product is at least one of pork, fresh vegetables, fruit, fresh red meat, or frozen red meat; or (ii) irradiating the food product with 0.15 kGy to about 0.3 kGy, wherein the food product is at least one of fresh poultry, frozen poultry, or eggs in their shell; and reducing a microbial content of said food product by at least about 0.3 $\log_{10}$.

2. The method of claim 1, further comprising packaging the food product before irradiation.

3. The method of claim 1, further comprising washing a food contact surface with an antimicrobial agent.

4. The method of claim 1, wherein the antimicrobial agent comprises a peroxycarboxylic acid.

5. The method of claim 4, wherein the peroxycarboxylic acid comprises peroxyacetic acid.

6. The method of claim 4, wherein the peroxycarboxylic acid comprises peroxyoctanoic acid.

7. The method of claim 4, wherein the antimicrobial agent comprises a densified fluid peroxycarboxylic acid composition.

8. The method of claim 1, wherein irradiating comprises exposing the food product to gamma-radiation, X-rays, electron beam, or a combination thereof.

9. The method of claim 8, wherein exposing the food product to gamma-radiation employs gamma-radiation produced by cobalt-60 or cesium-137.

10. The method of claim 8, wherein exposing the food product to X-rays comprises electron beam bombardment of tungsten or tantalum.

11. The method of claim 8, wherein exposing the food product to electron beam comprises single or double sided electron beam irradiation.

12. A method of treating a food product to reduce microbial burden, comprising:

contacting the food product with an antimicrobial agent, the antimicrobial agent comprising peroxycarboxylic acid, fatty acid, halogen containing antimicrobial agent, quaternary ammonium antimicrobial agent, peroxide, condensed phosphate, or mixtures thereof;

irradiating the food product with about 1.5 kGy, wherein the food product is at least one of spices, dried vegetable seasonings, or herb; and reducing a microbial content of said food product by at least about 0.3 $\log_{10}$.

* * * * *